US012683673B2

(12) United States Patent
Li et al.

(10) Patent No.: US 12,683,673 B2
(45) Date of Patent: Jul. 14, 2026

(54) TECHNIQUES FOR INITIAL SIDELINK BEAM FORMING

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 206 days.

(21) Appl. No.: 18/440,515

(22) Filed: Feb. 13, 2024

(65) Prior Publication Data

US 2024/0275464 A1     Aug. 15, 2024

Related U.S. Application Data

(60) Provisional application No. 63/485,244, filed on Feb. 15, 2023.

(51) Int. Cl.
| | |
|---|---|
| *H04L 5/12* | (2006.01) |
| *H04B 7/06* | (2006.01) |
| *H04L 5/00* | (2006.01) |
| *H04W 72/40* | (2023.01) |

(52) U.S. Cl.
CPC ....... *H04B 7/06954* (2023.05); *H04L 5/0048* (2013.01); *H04W 72/40* (2023.01)

(58) Field of Classification Search
CPC ... H04B 7/06954; H04W 72/40; H04L 5/0048
USPC ................ 375/262, 260, 259, 219, 295, 316
See application file for complete search history.

(56) References Cited

U.S. PATENT DOCUMENTS

| | | | | |
|---|---|---|---|---|
| 2022/0046430 A1* | 2/2022 | Liu | ...................... | H04B 7/0639 |
| 2022/0399917 A1* | 12/2022 | Shin | ...................... | H04L 1/1858 |

* cited by examiner

*Primary Examiner* — Zewdu A Kassa
(74) *Attorney, Agent, or Firm* — Patterson & Sheridan, LLP

(57) ABSTRACT

Certain aspects of the present disclosure provide techniques for wireless communication. An example method includes determining one or more parameters for an initial sidelink beamforming procedure involving one or more transmit beams, each associated with a respective antenna panel of a first UE, and performing the initial sidelink beamforming procedure using the one or more parameters. Performing the initial sidelink beamforming procedure includes transmitting at least a first physical sidelink shared channel (PSSCH) burst, comprising transmitting each PSSCH transmission of one or more PSSCH transmissions using a different respective transmit beam, wherein each PSSCH transmission of the one or more PSSCH transmissions includes respective initial sidelink beamforming information, monitoring, based on the initial sidelink beamforming information, for at least one response message from a second UE responding to at least one of the one or more PSSCH transmissions, and taking one or more actions based on the monitoring.

30 Claims, 17 Drawing Sheets

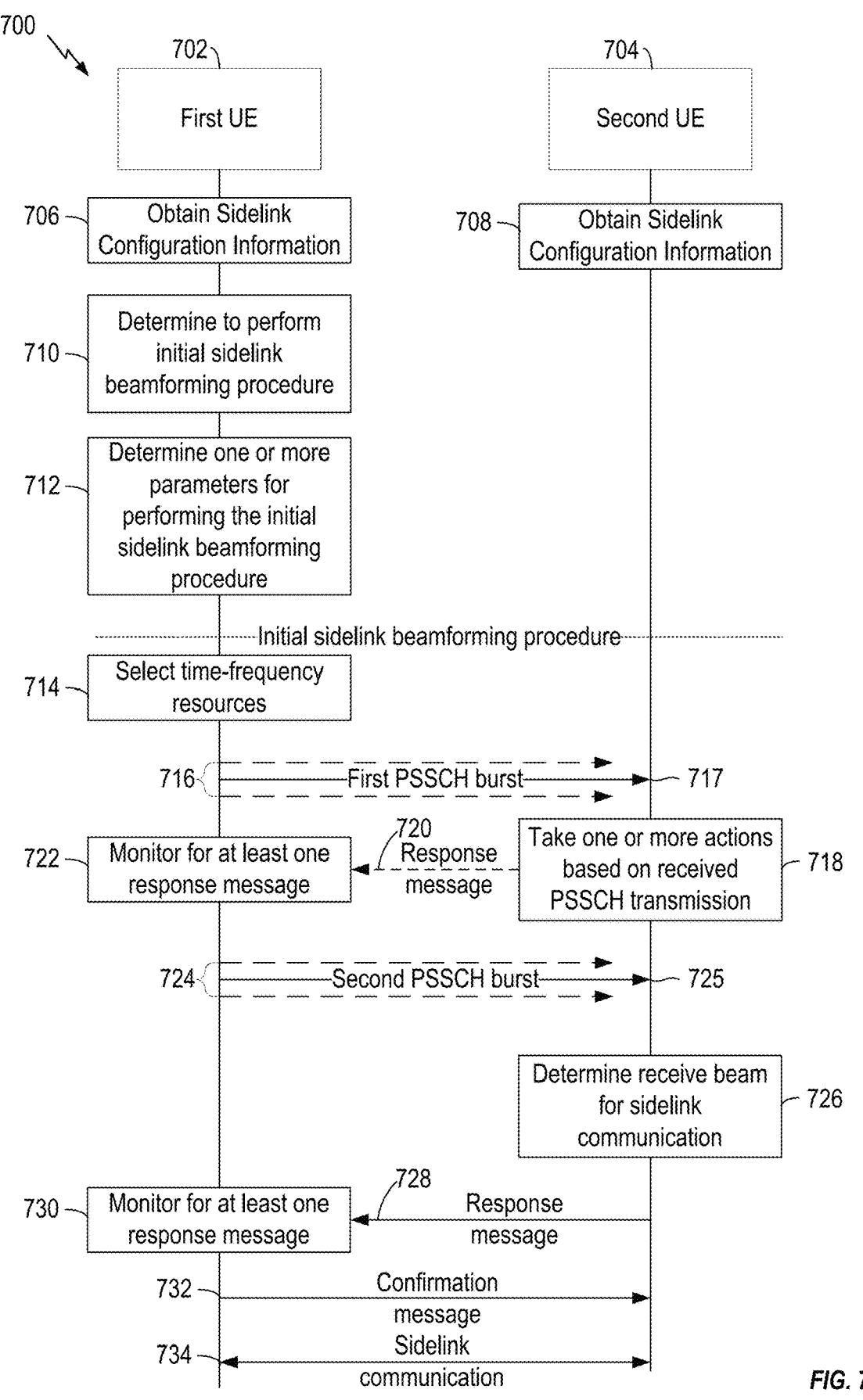

700

702

First UE

704

Second UE

706 — Obtain Sidelink Configuration Information

708 — Obtain Sidelink Configuration Information

710 — Determine to perform initial sidelink beamforming procedure

712 — Determine one or more parameters for performing the initial sidelink beamforming procedure Initial sidelink beamforming procedure 714 — Select time-frequency resources 716 — First PSSCH burst — 717

722 — Monitor for at least one response message

720 Response message

718 — Take one or more actions based on received PSSCH transmission

724 — Second PSSCH burst — 725

726 — Determine receive beam for sidelink communication

730 — Monitor for at least one response message

728 Response message

732 — Confirmation message

734 — Sidelink communication

FIG. 7

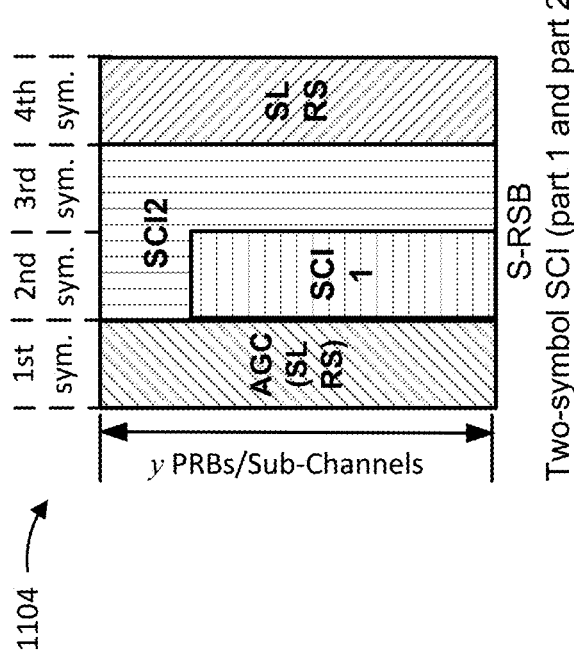
1104
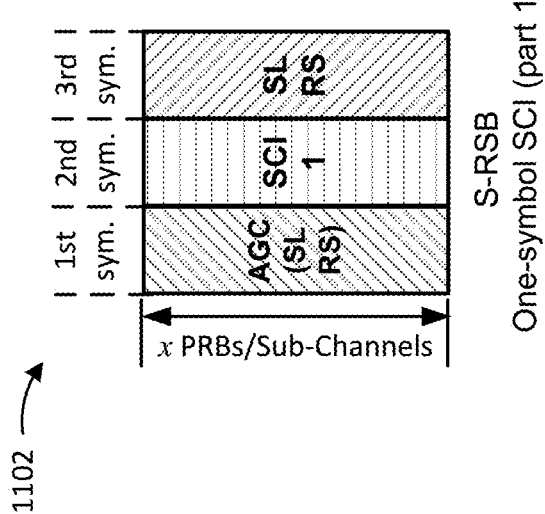
1102
*FIG. 11*

1200

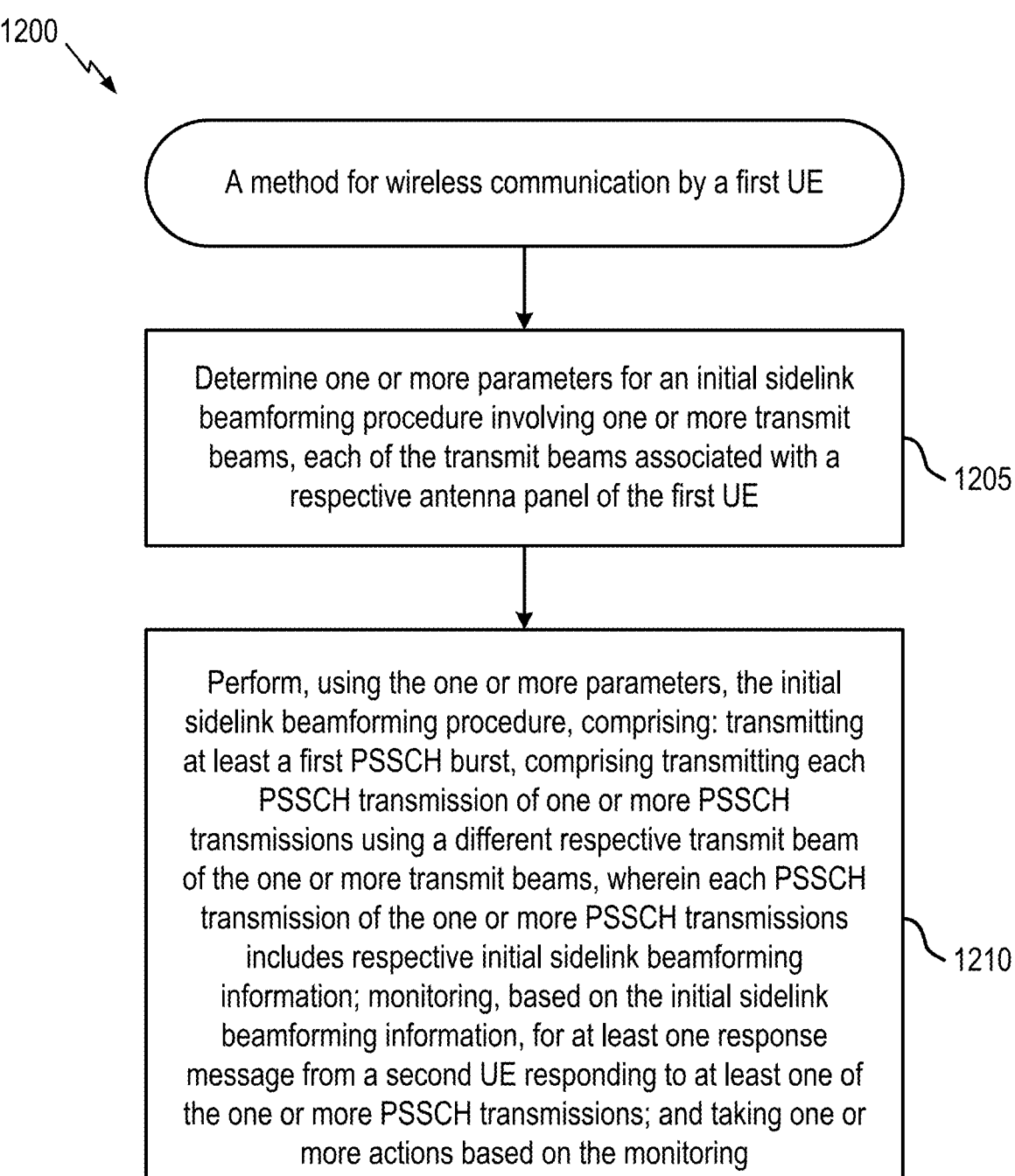

A method for wireless communication by a first UE

Determine one or more parameters for an initial sidelink beamforming procedure involving one or more transmit beams, each of the transmit beams associated with a respective antenna panel of the first UE

1205

Perform, using the one or more parameters, the initial sidelink beamforming procedure, comprising: transmitting at least a first PSSCH burst, comprising transmitting each PSSCH transmission of one or more PSSCH transmissions using a different respective transmit beam of the one or more transmit beams, wherein each PSSCH transmission of the one or more PSSCH transmissions includes respective initial sidelink beamforming information; monitoring, based on the initial sidelink beamforming information, for at least one response message from a second UE responding to at least one of the one or more PSSCH transmissions; and taking one or more actions based on the monitoring

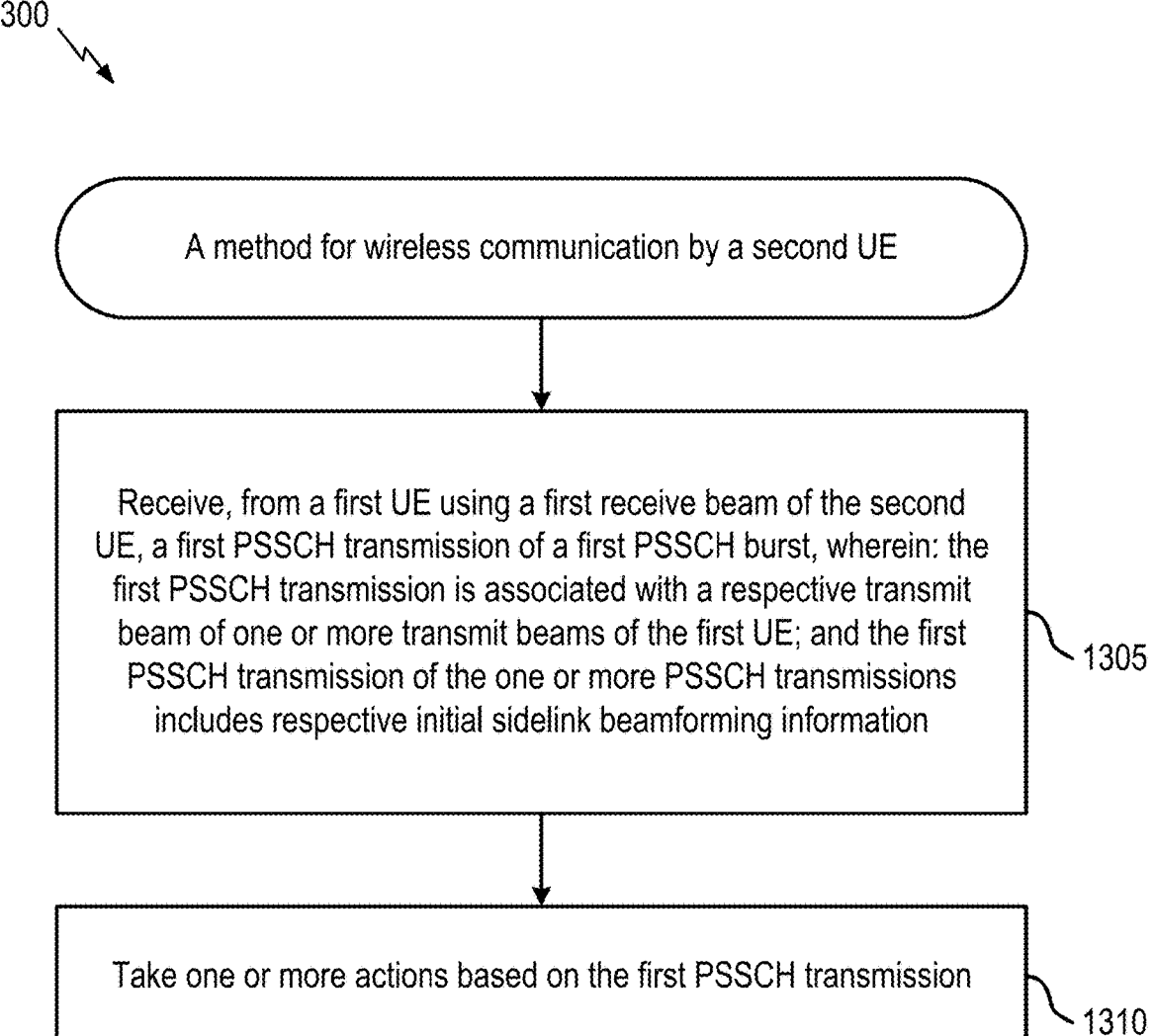

A method for wireless communication by a second UE

Receive, from a first UE using a first receive beam of the second UE, a first PSSCH transmission of a first PSSCH burst, wherein: the first PSSCH transmission is associated with a respective transmit beam of one or more transmit beams of the first UE; and the first PSSCH transmission of the one or more PSSCH transmissions includes respective initial sidelink beamforming information    1305

Take one or more actions based on the first PSSCH transmission    1310

*FIG. 13*

1400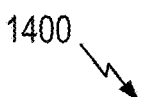

A method for wireless communication by a first UE

Receive, from a network entity, configuration information indicating one or more configurations for an initial sidelink beamforming procedure involving one or more transmit beams of the first UE, each of the transmit beams associated with a respective antenna panel of the first UE

1405

Perform, based on the configuration information, the initial sidelink beamforming procedure, comprising: transmitting at least a first beamforming burst, comprising transmitting each beamforming transmission of one or more beamforming transmissions using a different respective transmit beam of the one or more transmit beams of one or more antenna panels of the first UE; monitoring for at least one response message from a second UE responding to at least one of the one or more beamforming transmissions; and taking one or more actions based on the monitoring

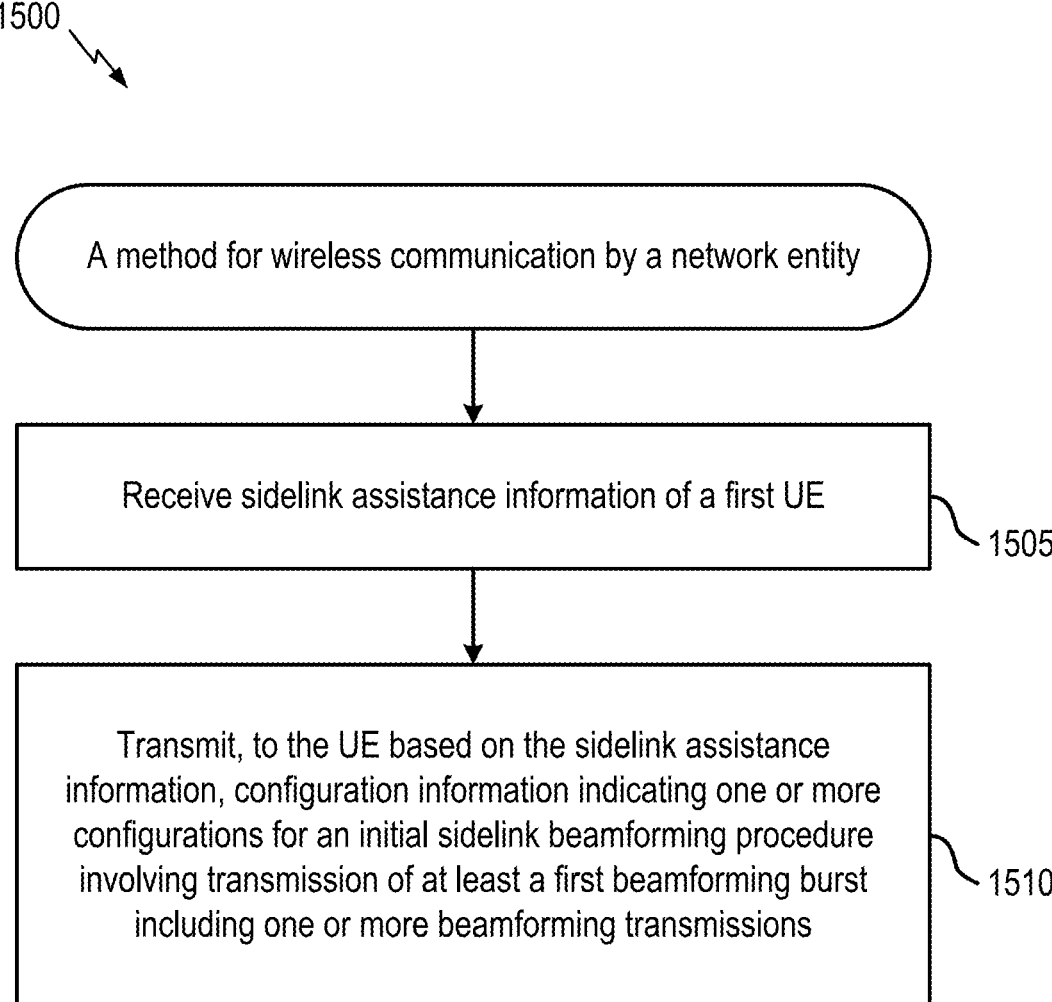

A method for wireless communication by a network entity

Receive sidelink assistance information of a first UE

1505

Transmit, to the UE based on the sidelink assistance information, configuration information indicating one or more configurations for an initial sidelink beamforming procedure involving transmission of at least a first beamforming burst including one or more beamforming transmissions

TECHNIQUES FOR INITIAL SIDELINK BEAM FORMING

CROSS-REFERENCE TO RELATED APPLICATIONS

This application claims benefit of and priority to U.S. Provisional Application No. 63/485,244, filed Feb. 15, 2023, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for performing an initial sidelink beamforming procedure.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a first user equipment (UE). The method includes determining one or more parameters for an initial sidelink beamforming procedure involving one or more transmit beams, each of the transmit beams associated with a respective antenna panel of the first UE; and performing, using the one or more parameters, the initial sidelink beamforming procedure, comprising: transmitting at least a first physical sidelink shared channel (PSSCH) burst, comprising transmitting each PSSCH transmission of one or more PSSCH transmissions using a different respective transmit beam of the one or more transmit beams, wherein each PSSCH transmission of the one or more PSSCH transmissions includes respective initial sidelink beamforming information; monitoring, based on the initial sidelink beamforming information, for at least one response message from a second UE responding to at least one of the one or more PSSCH transmissions; and taking one or more actions based on the monitoring.

Another aspect provides a method for wireless communication by a second UE. The method includes receiving, from a first UE using a first receive beam of the second UE, a first PSSCH transmission of a first PSSCH burst, wherein: the first PSSCH transmission is associated with a respective transmit beam of one or more transmit beams of the first UE; and the first PSSCH transmission of the one or more PSSCH transmissions includes respective initial sidelink beamforming information; and taking one or more actions based on the first PSSCH transmission.

Another aspect provides a method for wireless communication by a first UE. The method includes receiving, from a network entity, configuration information indicating one or more configurations for an initial sidelink beamforming procedure involving one or more transmit beams of the first UE, each of the transmit beams associated with a respective antenna panel of the first UE; and performing, based on the configuration information, the initial sidelink beamforming procedure, comprising: transmitting at least a first beamforming burst, comprising transmitting each beamforming transmission of one or more beamforming transmissions using a different respective transmit beam of the one or more transmit beams of one or more antenna panels of the first UE; monitoring for at least one response message from a second UE responding to at least one of the one or more beamforming transmissions; and taking one or more actions based on the monitoring.

Another aspect provides a method for wireless communication by a network entity. The method includes receiving sidelink assistance information of a first UE; and transmitting, to the UE based on the sidelink assistance information, configuration information indicating one or more configurations for an initial sidelink beamforming procedure involving transmission of at least a first beamforming burst including one or more beamforming transmissions.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 7 depicts a process flow including operations for communication in a network between a first user equipment and a second user equipment.

FIG. 11 provides an illustration of two different types of S-RSBs that may be used when performing an initial sidelink beamforming procedure.

FIG. 12 depicts a method for wireless communications.

FIG. 13 depicts a method for wireless communications.

FIG. 14 depicts a method for wireless communications.

FIG. 15 depicts a method for wireless communications.

DETAILED DESCRIPTION

Figure 1:
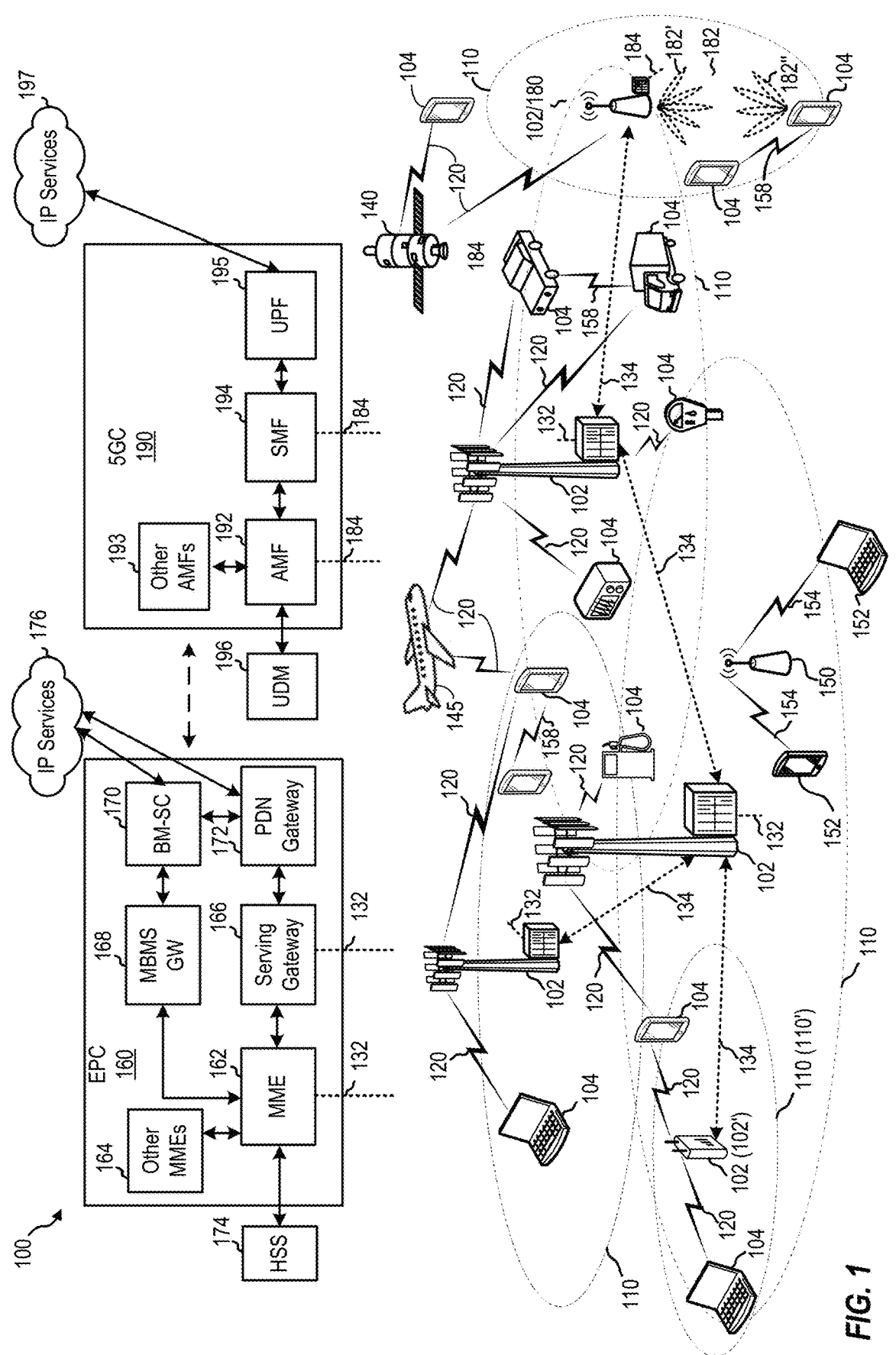
FIG. 1 depicts an example wireless communications network.

Aspects of the present disclosure provide apparatuses, methods, processing systems, and computer-readable mediums for techniques for performing an initial sidelink beamforming procedure.

Sidelink (SL) communication generally refers to direct communications between devices, such as user equipments (UEs). In some cases, SL communication may beneficially allow for communication between such devices without involving network resources (e.g., base stations), though a network may be involved with configuring the sidelink resources. Generally, sidelink communications structures mimic those used in non-sidelink communications with a network, such as slot-based allocation of time and frequency resources to determine when a device may transmit and/or receive data. A slot generally refers to a fixed number of symbols, such as 14 orthogonal frequency-division multiplexing (OFDM) symbols.

Resources for sidelink communications may be allocated using different sidelink allocation modes, such as sidelink resource allocation Mode 1 and sidelink resource allocation Mode 2. For example, in Mode 1 operation, a network entity (e.g., a base station) indicates to a sidelink UE which time-frequency resources to use to communicate (e.g., receive or transmit) a sidelink transmission. In Mode 2 operation, the sidelink UE identifies and selects time-frequency resources for the sidelink transmissions on its own (e.g., without the assistance of the network entity), for example, based on channel sensing.

In wireless communications, frequency range 2 (FR2) generally refers to operational frequencies that have been allocated to 5G in a millimeter wave (mmWave) region (e.g., above 24 GHz). In comparison to the earlier generations of cellular networks that used frequencies in the sub-1 GHz range, FR2 provides wider bandwidth and more capacity for data transmission. The wider bandwidth also enables advanced technologies such as beamforming and massive MIMO, which can improve the reliability and performance of 5G networks. For these reasons, the FR2 frequency band is well-suited for sidelink communications. However, the higher operational frequencies associated with FR2 may lead to higher signal attenuation and increased path loss, reducing signal range and quality, leading to dropped transmissions and wasted power.

When using FR2, sidelink UEs may experience significant signal attenuation. As such, these sidelink UEs may use a technique known as beamforming (e.g., involving the use of narrow, high gain transmit and receive beams) to ensure a quality of service (QoS) requirement and a communication range for sidelink communications is maintained. Beamforming may help to overcome the challenges with using FR2 for sidelink communications by focusing transmission energy in a narrow, high gain beam, towards a receiver, increasing signal power while reducing path loss and interference with other signals in the same frequency band.

Aspects of the present disclosure provide techniques for an initial sidelink beamforming procedure, which includes transmitting a plurality of beamforming bursts. The initial sidelink beamforming procedure may be performed by a sidelink transmit UE in order to discover at least one sidelink receive UE and/or establish direct communication connection with at least one sidelink receive UE via one or more beam pairings (e.g., establish beam pair links) between the sidelink transmit UE and the at least one sidelink receive UE. The initial sidelink beamforming procedure utilizes time-frequency resources in FR2, which may be selected, using Mode 1 or Mode 2 sidelink resource allocation, for communicating the beamforming bursts and response messages to the beamforming bursts. The time-frequency resources must be properly determined without error in order to ensure timely beamforming for initiating a reliable sidelink communication.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
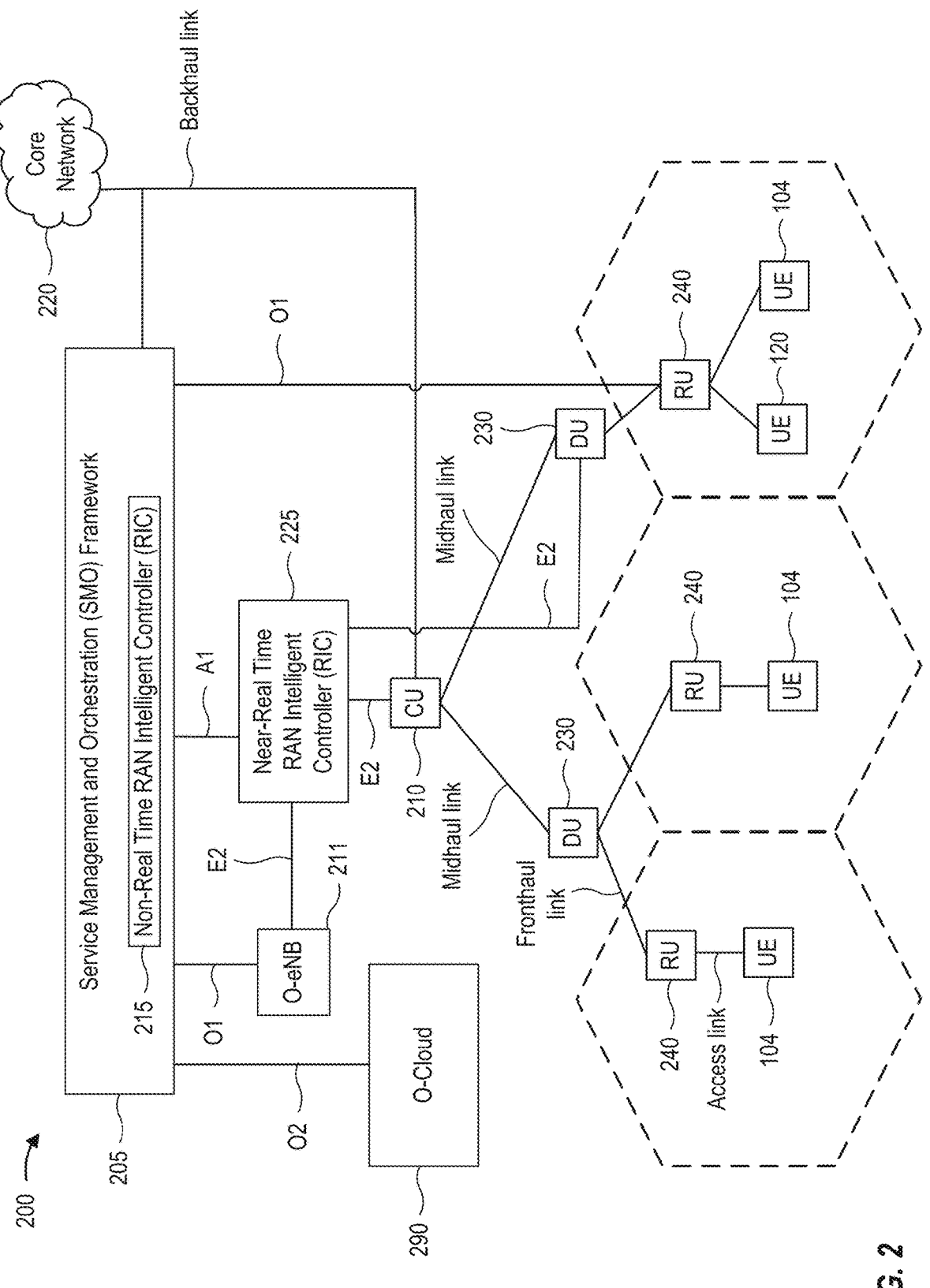
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
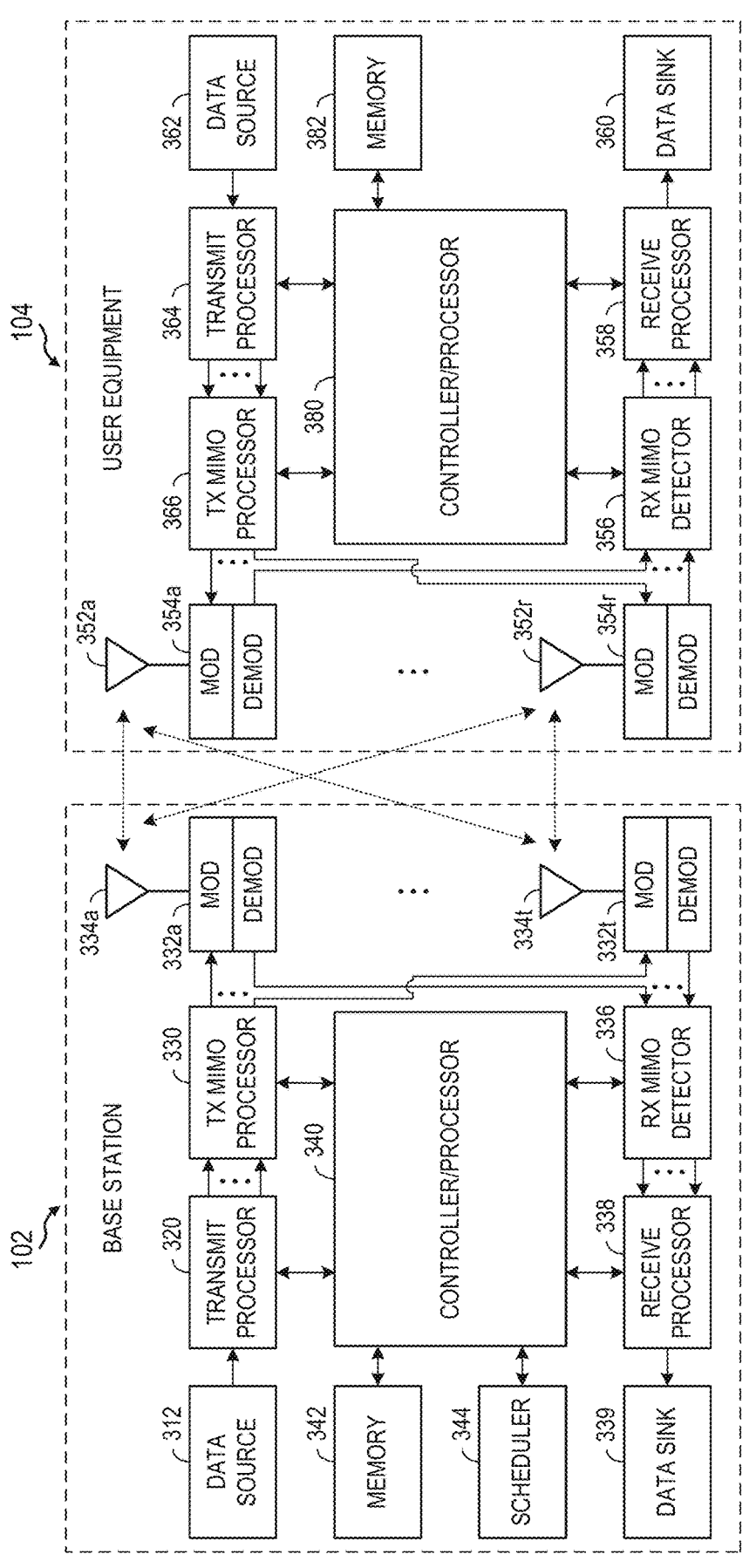
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
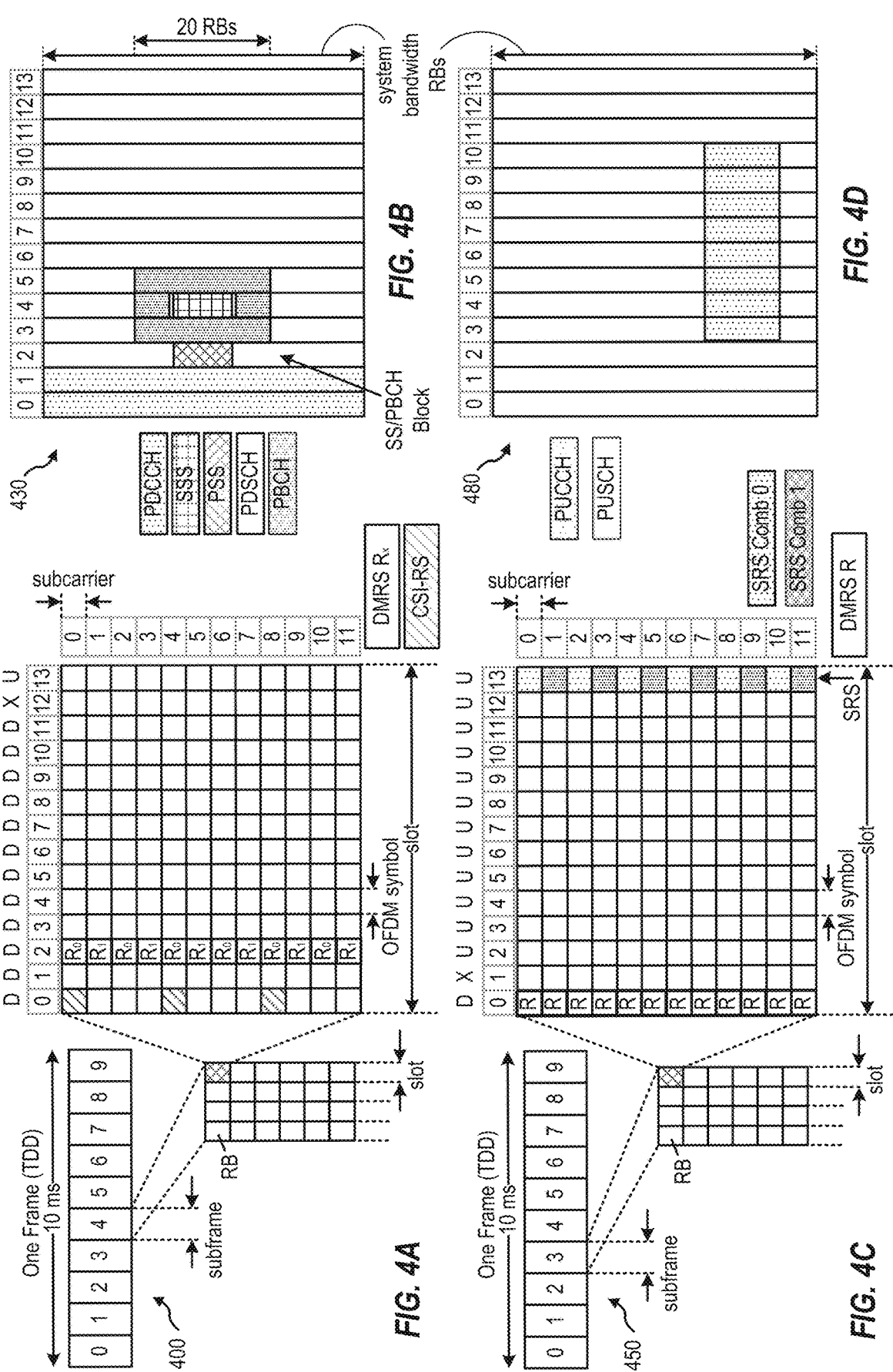
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$slots/subframe. The subcarrier spacing and symbol length/duration are a function of the numerology. The subcarrier spacing may be equal to $2^\mu \times 15$ kHz, where $\mu$ is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Sidelink Resource Allocation Modes

Resources for sidelink communications may be allocated using different sidelink allocation modes, such as sidelink resource allocation mode 1 (herein as Mode 1) and sidelink resource allocation mode 2 (herein as Mode 2). For example, in Mode 1 operation, a network entity, such as a base station, indicates to a sidelink UE which resources to use to communicate (e.g., receive or transmit) a sidelink transmission. In Mode 2 operation, the sidelink UE identifies and selects the resources for the sidelink transmissions on its own (e.g., without the assistance of the network entity), for example, based on channel sensing.

In Mode 1 operation, the resources that the sidelink UE may use to transmit may be dynamically scheduled in a downlink control information (DCI) message, such as a DCI 3_0 message. The DCI message may include a time resource assignment, indicating which slot the sidelink transmit user equipment can use to transmit a sidelink transmission. The time resource assignment may indicate up to three sidelink slots, the first of which may be an initial transmission, and the second and third of which may be retransmissions. Additionally, the DCI message also includes a frequency resource assignment, indicating where in the frequency spectrum the sidelink UE can transmit the sidelink transmission.

In addition to the DCI message, sidelink control information (SCI) may also contain a time resource assignment. The SCI time resource assignment may be used by a sidelink user equipment to indicate to another sidelink user equipment (e.g., a receiving sidelink user equipment) which slot it will use to make the sidelink transmission.

In Mode 2 operation, as noted above, a sidelink transmitter UE determines which resources it will use for the sidelink transmission, for example, based on channel sensing. Once the sidelink transmitter UE determines which resources to use, the sidelink transmitter UE may include that information in the time resource assignment of the SCI to indicate to a sidelink receiver UE in which slots to expect to receive sidelink transmissions.

In addition to the time resource assignment, the SCI may also include a resource reservation period. The resource reservation period can be used to reserve multiple slots at configurable periodicities. The reserved slots may be used for new, future transmissions.

Introduction to Sidelink Slot Structures

Sidelink communications generally refer to direct communications between devices, such as UE-to-UE communications. In some cases, sidelink communications may use communication structures, like slots, for these direct communications, which may comprise a configurable number of data symbols. For example, a typical slot may comprises 12 or 14 OFDM symbols, which may include, for example, downlink symbols, uplink symbols, flexible symbols, and other types. In some cases, a slot is marked for sidelink communications if it contains OFDM symbols that are configured for sidelink communications.

Sidelink slots may be defined by at least two parameters. First, a symbol start parameter may be used to indicate a symbol index of the first sidelink symbol of a sidelink slot. In other words, the symbol start parameter indicates where in the slot the sidelink portion starts. For example, the symbol start parameter may be a parameter such as sl-StartSymbol. Second, a symbol length parameter may be used to indicate the length of the sidelink slot in symbols. For example, the symbol length parameter may be sl-LengthSymbols. In some cases, these parameters may be configured per sidelink bandwidth part (SL-BWP).

Figure 5B:
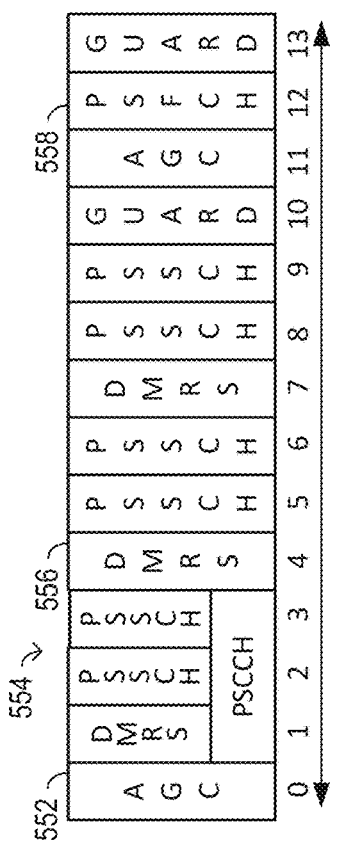
FIGS. 5A and 5B depict different sidelink slots.
Figure 5A:
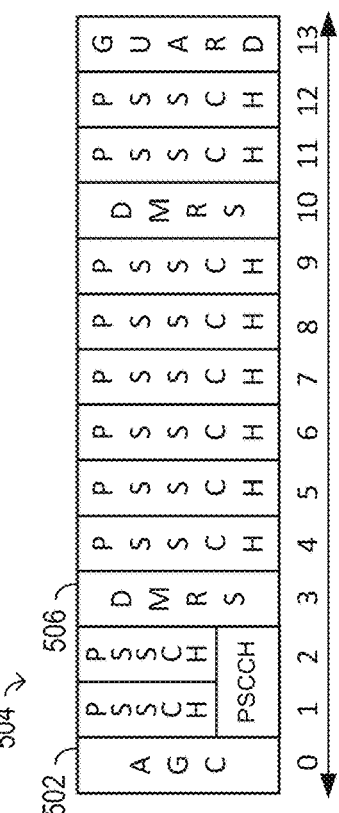

FIG. 5A and FIG. 5B illustrate example sidelink slots configured for 2-symbol sidelink control information (SCI) and 3-symbol SCI, respectively. Sidelink slots may have specific structure (or format) characteristics, such as beginning with a symbol configured for automatic gain control (AGC), as illustrated at 502 and 552.

As shown, the sidelink slots illustrated in FIGS. 5A and 5B may be used to transmit information for various types of sidelink channels, such as a physical sidelink shared channel (PSSCH), a physical sidelink control channel (PSCCH), a physical sidelink feedback channel (PSFCH), and demodulation reference signals (DMRS).

As shown in FIG. 5A, symbols for PSSCH transmission may begin in the second symbol of the slot and can be, for example, five to twelve symbols long. In some cases, the PSSCH may be used to transmit data and control information (e.g., a second stage SCI (herein as SCI 2) or MAC CE(s) or PC5 RRC message). In some cases, PSSCH transmissions (e.g., indicated in SCI 2) may provide control information for hybrid automatic repeat request (HARQ) procedures or channel state information (CSI) feedback triggers. Additionally, PSSCH transmissions may be associated with DMRSs such as those illustrated at 506 and 556 as well as one or more phase tracking reference signals (PT-RS). DMRS generally provides information about the channel state and the transmission parameters to the receiver UE, which can be used to improve the accuracy of the demodulation process and thus enhance the quality of the received signal.

Further, the PSCCH may be used to carry first stage SCI (herein as SCI 1) and may be frequency multiplexed with PSSCH in symbols 1-2 in FIG. 5A and symbols 1-3 in FIG. 5B. In some cases, the first stage SCI carried on the PSCCH may be used to indicate time-frequency resources reserved for future PSSCH transmissions. In some cases, the first stage SCI may be used to maintain a record of which resources have been reserved by other UEs in the recent past. In some cases, for semi-persistent scheduling (SPS), the first stage SCI may include a resource reservation period field that may be used to indicate a time interval for periodic transmissions in the future. Further, in some cases, the PSCCH may also be associated with a DMRS to improve the accuracy of demodulating the PSCCH.

Additionally, in some cases, as illustrated in FIG. 5B, sidelink slots may include a PSFCH that may be used to carry HARQ feedback from a receiver UE which is an intended recipient of a PSSCH transmission to the transmitter UE that performed the PSSCH transmission. In some cases, a PSFCH sequence may be transmitted over one physical resource block (PRB) repeated over two orthogonal frequency division multiplexing (OFDM) symbols near the end of a sidelink resource in a slot, as shown at 558 in FIG. 5B.

Remaining symbols in a sidelink slot are generally either gap symbols, downlink symbols, and/or uplink symbols, though other symbols are possible. These are just some examples, and other configurations are possible.

Introduction to Frequency Range 2 (FR2) Communication

In wireless communications, FR2 generally refers to operational frequencies that have been allocated to 5G in a millimeter wave (mmWave) region (e.g., above 24 GHz)

In comparison to the earlier generations of cellular networks that used frequencies in the sub-1 GHz range, FR2 provides wider bandwidth and more capacity for data transmission, which is important for supporting the growing demand for high-speed mobile internet and other data-intensive applications. The wider bandwidth also enables advanced technologies such as beamforming and massive MIMO, which can improve the reliability and performance of 5G networks. The use of the FR2 frequency band is a key factor in the development of 5G networks and the realization of their full potential to provide faster, more reliable, and more flexible wireless communication services to users.

As noted above, sidelink communications refers to direct communication between two devices, such as UE-to-UE communication. In some cases, FR2 may be used for sidelink communications in wireless networks. This type of communication is becoming increasingly important as the demand for decentralized and peer-to-peer (P2P) communications continues to grow, especially in applications such as Vehicle-to-Vehicle (V2V) and Vehicle-to-Everything (V2X) communications, and Machine-to-Machine (M2M) communications.

The FR2 frequency band is well-suited for sidelink communications because it provides wider bandwidth and more capacity for data transmission compared to other frequency bands, which is important for supporting high-speed and high-volume data transmission. Additionally, the FR2 band enables the use of advanced technologies such as beamforming and massive MIMO, which can improve the performance and reliability of sidelink communications.

For example, in ProSe communications, FR2 can be used for direct communication between users, which can enable a range of D2D applications for commercial or public safety use cases. For another example, in V2V communications, FR2 can be used for direct communication between vehicles, which can enable a range of safety-critical applications such as collision avoidance and emergency warning systems. Similarly, in M2M communications, FR2 can be used for direct communication between devices, which can enable a range of industrial and commercial applications such as asset tracking, supply chain management, and remote maintenance.

Aspects Related to Techniques for Sidelink Beamforming

As noted above, in order to provide wider bandwidth and more capacity for data transmission, sidelink communication may be performed using the FR2 frequency range. The use of FR2 for sidelink communications provides a high-speed and reliable communication path for various applications, allowing for more flexible and more efficient communication networks. However, the higher operational frequencies associated with FR2 may lead to higher signal attenuation and increased path loss, reducing signal range and quality, and leading to dropped transmissions and wasted power.

With significant signal attenuation (e.g., FR2, especially FR2-2), sidelink UEs may need to use a technique known as beamforming (e.g., involving the use of narrow, high gain transmit and receive beams) to ensure a quality of service (QoS) requirement for a sidelink communications is maintained. Additionally, because sidelink communication involves UE-to-UE communication (e.g., which requires UEs to participate in a discovery process to discover one another or direct link establishment), sidelink UEs may also need to use beamforming to maintain a certain communication range for sidelink discovery or direct link establishment, such as for peer discovery for ProSe applications or direct communication request for establishing a PC5 link for unicast supporting a ProSe application or a V2X service.

In some cases, when initiating sidelink communication based on the FR2 frequency range, a sidelink transmit UE may perform an initial sidelink beamforming procedure. The initial sidelink beamforming procedure may be performed by the transmit UE in order to discover at least one sidelink receive UE and establish one or more beam pairings (e.g., beam pair links) between the sidelink transmit UE and the at least one sidelink receive UE.

Figure 6:
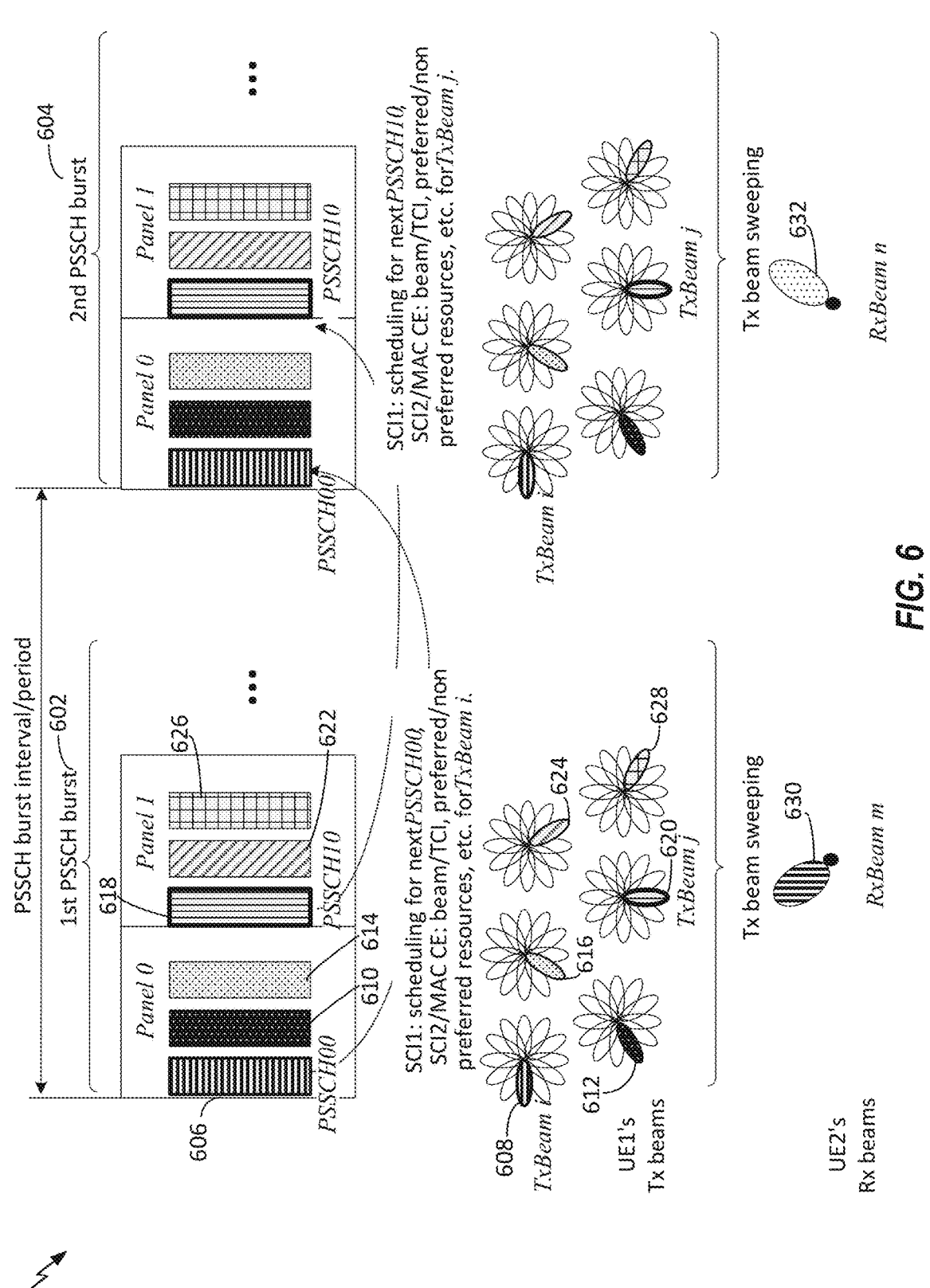
FIG. 6 illustrates an initial sidelink beamforming procedure performed between a first user equipment and a second user equipment.

FIG. 6 illustrates an initial sidelink beamforming procedure 600 performed between a first UE (e.g., UE 1) and a second UE (e.g., UE 2). The initial sidelink beamforming procedure 600 involves the first UE transmitting a plurality of PSSCH bursts, such as the first PSSCH burst 602 and a second PSSCH burst 604. As shown, the transmission of each PSSCH burst involves transmitting a plurality of PSSCH transmissions in different slots using different transmit (Tx) beams and different antenna panels, known as Tx beam sweeping. For example, as can be seen, transmission of the first PSSCH burst begins with the first UE transmitting a different PSSCH transmission from each of three different transmit beams of a first antenna panel (e.g., Panel 0).

Thereafter, the first UE then transmits a different PSSCH transmission from each of three different transmit beams of a second antenna panel (e.g., Panel 1). Each of the different PSSCH transmissions may be transmitted in different time slots.

For example, as shown, the first UE may begin with transmitting a first PSSCH transmission (e.g., PSSCH 00) in a first time slot 606 using a first transmit beam 608 (e.g., TxBeam_i) of the first antenna panel (e.g., Panel 0). Thereafter, the first UE transmits a second PSSCH transmission (e.g., PSSCH 01) in a second time slot 610 using a second transmit beam 612 of the first antenna panel (e.g., Panel 0). Thereafter, the first UE transmits a third PSSCH transmission (e.g., PSSCH 02) in a third time slot 614 using a third transmit beam 616 of the first antenna panel (e.g., Panel 0).

Once PSSCH transmissions have been transmitted from all available transmit beams (e.g., available or configured for the initial sidelink beamforming procedure 600), the first UE then moves on to transmitting PSSCH transmissions from a second antenna panel (e.g., Panel 1). For example, as shown, the first UE transmits a fourth PSSCH transmission (e.g., PSSCH 10) in a fourth time slot 618 using a fourth transmit beam 620 (e.g., TxBeam_j) of the second antenna panel (e.g., Panel 1). Thereafter, the first UE transmits a fifth PSSCH transmission (e.g., PSSCH 11) in a fifth time slot 622 using a fifth transmit beam 624 of the second antenna panel (e.g., Panel 1). Thereafter, the first UE transmits a sixth PSSCH transmission (e.g., PSSCH 12) in a sixth time slot 626 using a sixth transmit beam 628 of the second antenna panel (e.g., Panel 1).

As shown, the second UE may monitor for and receive one or more of the PSSCH transmissions of the first PSSCH burst 602 using a first receive (Rx) beam 630 (e.g., RxBeam_m). The second UE may then perform beam measurements associated with the first receive beam 630 based on the received one or more PSSCH transmissions. These beam measurements may include, for example, sidelink reference signal received power (SL RSRP) measurements (e.g., SL RSRP of the DMRS associated to PSCCH or PSSCH). In some cases, if the beam measurements associated with the receive beam 630 are not satisfactory (e.g., SL RSRP is below a threshold), the second UE may be configured to switch to a second receive beam 632 (e.g., RxBeam_n) to receive and perform beam measurements on PSSCH transmissions of the second PSSCH burst 604 transmitted by the first UE. The techniques for transmitting the second PSSCH burst 604 may be similar to those described above for transmitting the first PSSCH burst 602.

Additionally, it should be noted that, while the techniques described above for performing the initial sidelink beamforming procedure involve only the transmission of PSSCH bursts including one or more PSSCH transmissions, other types of beamforming bursts and beamforming transmissions may be used. For example, in some cases, rather than performing the initial sidelink beamforming procedure based on one or more PSSCH transmissions, the first UE may instead perform the initial sidelink beamforming procedure based on one or more sidelink reference signal blocks (S-RSBs) (e.g., as shown in FIG. 11).

Regardless of what type of beamforming transmission is used to perform the initial sidelink beamforming procedure, these beamforming transmissions may be transmitted to the second UE using time-frequency resources (e.g., within the FR2 frequency range). Moreover, any response messages from the second UE to the first UE based on these beamforming transmissions will also need to be transmitted using time-frequency resources. The manner in which these one or more sets of time-frequency resources, however, depends on a sidelink resource allocation mode used for sidelink communication between the first UE and the second UE, such as Mode 1 or Mode 2 sidelink resource allocation.

Proper determination of the time-frequency resources for the first UE to transmit the beamforming transmissions using different transmit beams is necessary to avoid collisions with beamforming transmissions associated with other UEs. Additionally, proper determination of time-frequency resources for the first UE to monitor for response messages to these beamforming transmissions using corresponding receive beams is necessary to ensure the reception of these response transmissions. Collisions in the transmissions or errors in the reception may lead to these transmission bursts being retransmitted, unnecessarily consuming additional time-frequency resources within a wireless network for these retransmissions and wasted power at both the first UE and the second UE. Moreover, proper determination of the time-frequency resources for transmitting the beamforming transmissions and the time-frequency resources for transmitting response messages to these beamforming transmissions is necessary to avoid interference that could be caused to other signals if the time-frequency resources for these transmissions were not properly determined.

Accordingly, aspects of the present disclosure provide techniques for performing an initial sidelink beamforming procedure associated with different sidelink resource allocation modes. For example, aspects of the present disclosure provide techniques for performing an initial sidelink beamforming procedure when a sidelink resource allocation Mode 1 is used. Additionally, aspects of the present disclosure provide techniques for performing an initial sidelink beamforming procedure when a sidelink resource allocation Mode 2 is used. More specifically, the techniques presented herein may assist a sidelink UE in determining time-frequency resources for transmitting one or more beamforming bursts (e.g., including the transmission of one or more beamforming transmissions) as well as the transmission of one or more response messages when sidelink resource allocation Mode 1 or Mode 2 is being used. The techniques presented herein may help to avoid the issues described above related to interference and wasted time-frequency resources and wasted power resources.

Example Operations for Initial Sidelink Beamforming for Sidelink Resource Allocation Mode 2

FIG. 7 depicts a process flow including operations 700 for communication in a network between a first UE 702 and a second UE 704. Both of the first UE 702 and second UE 704 may be sidelink UEs capable of communicating with each other using sidelink communications in an FR2 frequency band. In some cases, the first UE 702 and the second UE 704 may be an example of UE 104 depicted and described with respect to FIGS. 1 and 3.

The operations 700 presented below relate to an initial sidelink beamforming procedure to be performed based on a sidelink resource allocation Mode 2 in which the first UE 702 determines time-frequency resources for transmitting one or more beamforming bursts without assistance from a network node, such as a gNodeB (gNB). For example, as will be described in greater detail below, performing the initial sidelink beamforming procedure may involve transmitting at least a first PSSCH burst of one or more PSSCH bursts. In some cases, transmitting at least the first PSSCH burst may include transmitting each PSSCH transmission of one or more PSSCH transmissions of at least the first PSSCH burst using a different respective transmit beam of one or more transmit beams of one or more antenna panels of the first UE 702.

As shown, operations 700 begin in steps 706 and 708 with the first UE 702 and second UE 704, respectively, obtaining configuration information for sidelink communication. In some cases, the configuration information may include a sidelink configuration for an FR2 frequency band (e.g., SL-FR2Config) and may indicate at least one of a number of antenna panels to use for FR2-based sidelink communication, a number of transmit or receive beams to use for FR2-based sidelink communication associated with an antenna panel, one or more beam types (e.g., wide, medium or narrow beams), QoS requirements (e.g., latency, reliability, communication range, etc.) associated to a sidelink communication (e.g., a ProSe application or a V2X service), and the like. In some cases, the configuration information may be pre-configured in memory of the first UE 702 and/or second UE 704 by a manufacturer or retailer of the first UE 702 and/or second UE 704. In some cases, the configuration information may be received from a network entity, such as BS 102 illustrated and described with respect to in FIGS. 1, 2, and 3.

Thereafter, in step 710, the first UE 702 determines to perform the initial sidelink beamforming procedure. In some cases, the determination to perform the initial sidelink beamforming procedure may be performed by a media access control (MAC) layer of the first UE 702 and based on whether or not the MAC layer has received, from higher layers (e.g., ProSe application or V2X service), a trigger to perform the initial sidelink beamforming procedure or an initial request for sidelink communication. For example, in some cases, a higher layer of the first UE 702 may send an indication to the PHY layer or MAC layer of the first UE 702 for initial beamforming prior to a sidelink communication or may send a data (e.g., an initial request message) to the MAC layer of the first UE 702 by indicating a logical channel identifier (LCID) associated with the initial request for sidelink communication (e.g., using unicast communication). In some cases, the initial request for sidelink communication comprises one of a ProSe discovery request message or a direct communication request for establishing direct connection (e.g., for a V2X service). In some cases, the initial request for sidelink communication comprises at least one of a sidelink application identifier (e.g., ProSe application ID), a service type identifier (e.g., V2X service type ID), or an identifier for one or more UEs (e.g., a default ID or a known ID for discovery or direct connection)

Thereafter, as illustrated in step 712, when the first UE 702 determines to perform the initial sidelink beamforming procedure, the first UE 702 may then determine one or more parameters for the initial sidelink beamforming procedure. In some cases, the one or more parameters comprise at least one of a duration of at least a first beamforming burst (e.g., the first PSSCH burst or a sidelink reference signal block (S-RSB) burst), a periodicity associated with the first beamforming burst (e.g., the first PSSCH burst or a S-RSB burst), or a time interval between beamforming bursts (e.g., the one or more PSSCH bursts or S-RSB bursts) of the first beamforming burst.

In some cases, the duration of at least the first beamforming burst may be based on at least one of a number of antenna panels for initiating a sidelink communication or sidelink beamforming or a number of transmit beams of one or more antenna panels for initiating a sidelink communication (e.g., initial request message on PSSCH) or sidelink beamforming (e.g., initial beamforming with S-RSB). In some cases, the number of antenna panels for initiating the sidelink communication or sidelink beamforming may be pre-configured in memory of the first UE 702, received in configuration information from a network entity (e.g., BS 102), or determined by the first UE 702 (e.g., based on the direction or area to discover one or more peer UEs or to establish direct connect with one or more UEs, or more other parameters). In some cases, the number of transmit beams for initiating a sidelink communication or sidelink beamforming may be pre-configured in memory of the first UE 702, received in configuration from the network entity, or determined by the first UE 702 (e.g., based on the space angular range (more beams for larger angular range or area) or communication range (more narrow beams for longer communication range) to discover one or more peer UEs or to establish direct connect with one or more UEs, or more other parameters).

In some cases, at least one of the periodicity of a beamforming burst or the time interval between beamforming bursts may be based on pre-configuration stored in memory of the first UE 702, configuration information received from the network entity, or determined by the first UE 702 based on a timing requirement associated with the initial sidelink beamforming procedure, or a timing requirement associated with an initial request for sidelink communication. The periodicity of a beamforming burst or time interval between beamforming bursts may be indicated in SCI (e.g., SCI 1) (e.g., transmitted within the one or more S-RSB transmissions or PSSCH transmissions). In some cases, the timing requirement may comprise, for example, a period or timer configured for the initial request for sidelink communication (e.g., ProSe discovery request or direct communication request) described above. In some cases, the timing requirement may comprise, for example, a period or timer configured for beam sweeping.

Thereafter, the first UE 702 performs the initial sidelink beamforming procedure using the one or more parameters. As will be described in greater detail below, performing the initial sidelink beamforming procedure may include transmitting at least a first beamforming burst (e.g., an S-RSB burst or the first PSSCH burst). Transmitting the first beamforming burst may, in turn, comprise transmitting each beamforming transmission (e.g., S-RSB or PSSCH transmission) of one or more beamforming transmissions of the first beamforming burst using a different respective transmit beam of the one or more transmit beams. In some cases, these techniques for transmitting the first beamforming burst may be similar to those described above with respect to FIG. 6.

In some cases, each beamforming transmission of the one or more beamforming transmissions of the first beamforming burst may include respective initial sidelink beamforming information. In some cases, the first UE 702 may indicate, in first stage sidelink control information (SCI) (e.g., using resource reservation) transmitted with each beamforming transmission of the first burst, the scheduling of the next one or two beamforming transmissions (e.g., at one or two reserved time-frequency resources) of the next one or two bursts respectively. In some cases, the first UE 702 may indicate, in first stage sidelink control information (SCI) (e.g., using reservation interval or period) transmitted with each beamforming transmission of the first beamforming burst, the semi-persistent scheduling of beamforming transmissions (e.g., at time-frequency resources spaced with reservation interval or period) of the future beamforming bursts.

In some cases, the first beamforming burst may include the first PSSCH burst, described above, and the one or more beamforming transmissions may include one or more PSSCH transmissions. In some cases, the first UE 702 may transmit, in the one or more PSSCH transmissions, the respective initial sidelink beamforming information in one or more a medium access control-control elements (MAC-CEs) or second stage sidelink control information (SCI). In some cases, for each PSSCH transmission of the one or more PSSCH transmissions, the respective initial sidelink beamforming information for that PSSCH transmission may include transmit beam information associated with a transmit beam for transmitting that PSSCH transmission and an indication of time-frequency resources that the second UE 704 should consider when transmitting, to the first UE 702, a response message to that PSSCH transmission. In some cases, the indication of the time-frequency resources may include at least one of: a set of preferred time-frequency resources for transmitting the at least one response message or a set of non-preferred time-frequency resources to avoid using to transmit the at least one response message.

For example, a first PSSCH transmission of the one or more PSSCH transmissions may include transmit beam information indicating a first transmit beam to be used to transmit the first PSSCH transmission. The first PSSCH transmission may also include an indication of time-frequency resources that should be used by the second UE 704 to transmit a response message (e.g., to the first UE 702) responding to the first PSSCH transmission. As noted, the indication of time-frequency resources may include a set of preferred time-frequency resources that the second UE 704 should use to transmit the response message to the first UE 702 or a set of non-preferred time-frequency resources that the second UE 704 should avoid using when transmitting the response message to the first UE 702. Similarly, a second PSSCH transmission of the one or more PSSCH transmissions may also include transmit beam information indicating a second transmit beam to be used to transmit the second PSSCH transmission as well an indication of time-frequency resources for transmitting a response message to the second PSSCH transmission. Accordingly, in this manner, each PSSCH transmission transmitted by the first UE 702 may indicate unique transmit beam information of the transmit beam to be used to transmit that PSSCH transmission as well as unique time-frequency resources for transmitting a response message to that PSSCH transmission.

As noted above, the transmit beam information may include information that identifies the transmit beam used to transmit a particular PSSCH transmission. For example, the transmit beam information associated with a particular transmit beam used for transmitting a particular PSSCH transmission may include at least one of a transmit beam identifier (ID) of the particular transmit beam, an index within a PSSCH burst that identifies the particular transmit beam, a transmission configuration indicator (TCI) state associated with the particular transmit beam (e.g., a quasi-colocation (QCL) association or relationship with the CSI-RS or DMRS transmitted with the PSSCH), or a spatial filter (e.g., beamforming function or beam mapping function that it forms the same beam (e.g., same direction, same shape, same power of the beam) associated with the particular transmit beam.

In order to transmit the first PSSCH burst, including the one or more PSSCH transmissions, the first UE 702 may determine time-frequency resources in which the one or more PSSCH transmissions may be transmitted. In some cases, these time-frequency resources may be determined using a sidelink resource allocation Mode 2, for example, without the assistance of a network node. Accordingly, for example, as shown in step 714 of FIG. 7, the first UE 702 is configured to select, at the MAC layer of the first UE 702, a set of time-frequency resources for transmitting at least the first PSSCH burst. In some cases, the set of time-frequency resources may be included in one of a continuous set of slots or a discontinuous set of slots. For example, as shown in FIG. 6, the set of time-frequency resources may include the time slots 606, 610, and 614 (and associated frequencies), which are continuous in time.

In some cases, selecting the set of time-frequency resources for transmitting the first PSSCH burst may be based on a number of antenna panels for initiating a sidelink communication or sidelink beamforming and a number of transmit beams of one or more antenna panels for initiating a sidelink communication or sidelink beamforming. For example, if the first UE 702 is configured to perform the initial sidelink beamforming procedure using two antenna panels and each antenna panel includes three transmit beams, then the set of time-frequency resources may include six resources for transmitting six PSSCH transmissions using the six transmit beams across both antenna panels (e.g., one resource per transmit beam per PSSCH transmission).

In some cases, the one or more PSSCH transmissions that will be transmitted by the first UE 702 as part of the first PSSCH burst may be based on one or more MAC protocol data units (PDUs). For example, in some cases, the first UE 702 may generate, in MAC layer of the first UE 702, one or more MAC PDUs. In some cases, each different MAC PDU of the one or more MAC PDUs may correspond to a respective PSSCH transmission of the one or more PSSCH transmissions. Further, in some cases, each MAC PDU includes, at least, the respective initial sidelink beamforming information (e.g., transmit beam and indication of resources for transmitting a response message) corresponding to the respective PSSCH transmission.

Whether each MAC PDU includes more information than just the respective initial sidelink beamforming information may be based on whether data has been obtained by the MAC layer from higher layers indicating the LCID associated with an initial request for sidelink communication or not. For example, when the initial sidelink beamforming procedure is triggered based on a trigger to perform the initial sidelink beamforming procedure (e.g., data has not been obtained by the MAC layer from higher layers indicating the LCID associated with an initial request for sidelink communication), the MAC PDUs may include the respective initial sidelink beamforming information (e.g., lacking an initial request for sidelink communication). However, when data has been obtained by the MAC layer from higher layers indicating the LCID associated with an initial request for sidelink communication, each MAC PDU generated by the first UE 702 may also include the initial request for sidelink communication.

Once the MAC layer of the first UE 702 has generated the one or more MAC PDUs, the MAC layer of the first UE 702 may assemble the one or more MAC PDUs and send them to a physical layer of the first UE 702 for transmission in the one or more PSSCH transmissions. In some cases, because the one or more MAC PDUs are generated and assembled in the MAC layer of the first UE 702, the physical layer of the first UE 702 may not know the content of the one or more MAC PDUs and, as a result, may not know that the one or more MAC PDUs are to be transmitted as a burst/beam sweeping within the first PSSCH burst. Accordingly, in some cases, the MAC layer of the first UE 702 may provide additional information to the physical layer indicating that the one or more MAC PDUs correspond to at least the first PSSCH burst. This additional information may allow the physical layer to treat the one or more MAC PDUs differently as compared to normal, non-burst PSSCH transmission.

In some cases, the additional information may further indicate a beam type for transmitting the one or more MAC PDUs in the one or more PSSCH transmissions. For example, in some cases, the beam type comprises one of a wide transmit beam, a medium transmit beam, or a narrow transmit beam. In some cases, the beam type may be indicated in the additional information using a 2-bit based index. In some cases, the beam type may be based on at least one of an angular range or area for sidelink communication (e.g., wide beams for large angular range or area), a communication range (e.g., narrow beams for long communication range) for sidelink communication, or a level of mobility (e.g., wide beams for high mobility) associated with the first UE 702.

In some cases, the MAC layer of the first UE 702 may provide other information to the physical layer indicating that the one or more MAC PDUs correspond to at least the first PSSCH burst. For example, in some cases, for each MAC PDU of the one or more MAC PDUs, the MAC layer may provide to the physical layer information indicating (1) transmit beam information associated with the different respective transmit beam to be used to transmit a first PSSCH transmission, of the one or more PSSCH transmissions, in which that MAC PDU is to be included and (2) at least one of a set of preferred time-frequency resources for transmitting the at least one response message corresponding the first PSSCH transmission including that MAC PDU or a set of non-preferred time-frequency resources to avoid using to transmit the at least one response message corresponding the first PSSCH transmission including that MAC PDU.

Accordingly, once the one or more MAC PDUs have been received by the physical layer of the first UE 702, the physical layer may process the one or more MAC PDUs and generate the one or more PSSCH transmissions of the first PSSCH burst. Additionally or alternatively, the physical layer may indicate the beamforming information and preferred resources or non-preferred resources in second stage SCI. Thereafter, as shown in step 716, the first UE 702 transmits the first PSSCH burst. For example, as noted above, transmitting the first PSSCH burst may include transmitting each PSSCH transmission of the one or more PSSCH transmissions using a different respective transmit beam of the one or more transmit beams. In some cases, the one or more PSSCH transmissions of the first PSSCH burst may be transmitted based on the one or more parameters for the initial sidelink beamforming procedure described above. Additionally, in some cases, the one or more PSSCH transmissions of the first PSSCH burst may be transmitted using the set of time-frequency resources selected by the MAC layer of the first UE 702. In some cases, the one or more PSSCH transmissions may include one or more MAC-CEs or SCI messages. Techniques for transmitting the one or more PSSCH transmissions may be similar to those described above with respect to the transmission of the first PSSCH burst 602 of FIG. 6.

As shown in FIG. 7, due to the one or more PSSCH transmissions being transmitted in different spatial directions using different transmit beams, the second UE 704 may receive, from the first UE 702, a first PSSCH transmission

717 of the first PSSCH burst using a first receive beam of the second UE 704. The first PSSCH transmission 717 may be associated with a respective transmit beam of one or more transmit beams of the first UE. Additionally, the first PSSCH transmission 717 of the one or more PSSCH transmissions may include respective initial sidelink beamforming information, which may be received in at least one of a MAC-CE or an SCI message (e.g., stage-2 SCI). For example, as described above, the respective initial sidelink beamforming information included within the first PSSCH transmission 717 received by the second UE 704 may include transmit beam information associated with the respective transmit beam of the first UE 702 used for transmitting the first PSSCH transmission 717. Additionally, the respective initial sidelink beamforming information may include at least one of a set of preferred time-frequency resources for transmitting at least one response message to the first UE 702 based on the first PSSCH transmission 717 or a set of non-preferred time-frequency resources to avoid using to transmit the at least one response message.

Thereafter, in step 718, the second UE 704 takes one or more actions based on the first PSSCH transmission 717. In some cases, as shown at 720, taking the one or more actions may comprise transmitting, using a first transmit beam of the second UE 704, at least one response message to the first UE 702 based on the respective initial sidelink beamforming information included in the first PSSCH transmission 717. In some cases, the at least one response message comprises at least one of a discovery response, a direct communication response, an acknowledgement (ACK) message, or a negative ACK (NACK) message.

In some cases, the first transmit beam of the second UE 704 used to transmit the at least one response message corresponds to the first receive beam of the second UE 704 used to receive the first PSSCH transmission 717. For example, the first transmit beam of the second UE 704 may share a QCL relationship with the first receive beam of the second UE 704, such as a QCL Type-D relationship. In other words, the first transmit beam of the second UE 704 and the first receive beam of the second UE 704 may have a spatial correspondence with one another (e.g., have a same or substantially similar spatial direction as one another).

In some cases, transmitting the at least one response message in step 720 comprises transmitting the response message in a sub-set of time-frequency resources according to one of the set of preferred time-frequency resources or the set of non-preferred time-frequency resources. Additionally, in some cases, the at least one response message may indicate at least one of the respective transmit beam of one or more transmit beams of the first UE 702 used to transmit the first PSSCH transmission 717 or the first receive beam of the second UE 704.

As shown in step 722 of FIG. 7, the first UE 702 monitors, based on the initial sidelink beamforming information included in each PSSCH transmission, for at least one response message from a second UE responding to at least one of the one or more PSSCH transmissions. In some cases, monitoring for the at least one response message may comprise using different subsets of time-frequency resources and one or more associated receive beams that respectively correspond with the one or more transmit beams used to transmit the one or more PSSCH transmissions. For example, each different respective transmit beam of the one or more transmit beams may be associated with a respective receive beam of the one or more receive beams. Further, each respective receive beam may be associated with a respective subset of time-frequency resources, of a set of time-frequency resources, to use to monitor for the at least one response message. Accordingly, monitoring for the at least one response message in step 722 may comprise monitoring each respective subset of time-frequency resources using each respective receive beam for the at least one response message.

In some cases, based on the monitoring in step 722, the first UE 702 may receive the response message transmitted by the second UE in step 720 responding to the first PSSCH transmission 717. In some cases, the first UE 702 may receive the response message using a first receive beam of one or more receive beams of the first UE 702 and associated respective subset of time-frequency resources. In some cases, the respective subset of time-frequency resources that may be monitored using the first receive beam of the first UE 702 to receive the response message may correspond to the time-frequency resources indicated in the respective initial sidelink beamforming information included within the first PSSCH transmission 717 received by the second UE 704.

In some cases, taking the one or more actions in step 718 by the second UE 704 may comprise determining whether to receive, from the first UE 702, at least a second PSSCH transmission 725 of a second PSSCH burst using at least a second receive beam of the second UE 704. In some cases, determining whether to receive the second PSSCH transmission 725 of the second PSSCH burst may be based on one or more criteria. For example, in some cases, the second UE 704 may determine whether to receive the second PSSCH transmission 725 of the second PSSCH burst based on at least one of a sidelink application identifier (e.g., for a ProSe application), a service type identifier (e.g., for a V2X service), or a default or known identifier for one or more UEs included within an initial request for sidelink communication (e.g., ProSe discovery request message, a direct communication request, etc.) in the first PSSCH transmission 717. For example, in some cases, the second UE 704 may determine to receive the second PSSCH transmission 725 when the second UE 704 is interested in a particular sidelink application as indicated by the application identifier for a ProSe application, interested in establishing a unicast link for a V2X service as indicated by the service type identifier, or interested in communicating with the one or more UEs identified by the default or known identifier for one or more UEs.

In some cases, determining whether to receive the second PSSCH transmission 725 of the second PSSCH burst may be based on beam measurements associated with the first receive beam of the second UE 704. For example, in some cases, the second UE 705 may be configured to perform sidelink reference signal received power (SL RSRP) measurements associated with the first receive beam of the second UE 704 based on the first PSSCH transmission 717 received from the first UE 702. For example, in some cases, determining whether to receive the second PSSCH transmission 725 of the second PSSCH burst may be based on the SL RSRP beam measurements (e.g., SL RSRP of DMRS or CSI-RS transmitted with the first PSSCH transmission 717 received) being less than an SL-RSRP threshold. In some cases, this SL-RSRP threshold may be pre-configured in memory of the second UE 704 or may be configured by a network entity for sidelink beamforming or sidelink communication pairing. In some cases, this SL-RSRP threshold may be pre-configured or configured for a QoS profile (e.g., based on communication range, reliability, etc.). In some cases, this SL-RSRP threshold may be pre-configured or configured for an application (e.g., a ProSe application) or a service (e.g., a V2X service). In some cases, this SL-RSRP threshold may be pre-configured or configured for different mobility levels of the UE or different channel conditions (e.g., CBR levels).

For example, determining whether to receive at least the second PSSCH transmission 725 may comprise determining to receive at least the second PSSCH transmission 725 when the beam measurements are less than the threshold (e.g., a signal quality of the first receive beam of the second UE 704 is poor). In such cases, in order to trigger the first UE 702 to transmit a second PSSCH burst and to receive the second PSSCH transmission 725 from the first UE 702, the second UE 704 may be configured to transmit, in the response message transmitted in step 720, a negative acknowledgement information (NACK) or a request to transmit at least the second PSSCH burst (e.g., at the time and frequency resources reserved or indicated in the first PSSCH burst).

Alternatively, in some cases, in order to trigger the first UE 702 to transmit the second PSSCH burst and to receive the second PSSCH transmission 725 from the first UE 702, the second UE 704 may refrain from transmitting the response message in step 720 altogether. For example, if the first UE 702 does not receive any response messages to the one or more PSSCH transmissions in the first PSSCH burst within a threshold amount of time or at the set of preferred resources indicated in the first PSSCH burst, the first UE 702 may be configured to automatically transmit the second PSSCH burst, for example, based on the one or more parameters determined in step 712 of FIG. 7.

Accordingly, as shown in step 724, when the first UE 702 is triggered (e.g., NACK or explicit request in the response message in step 720) or does not receive a response to the one or more PSSCH transmissions of the first PSSCH burst within a threshold amount of time or at the set of preferred resources indicated in the first PSSCH burst, the first UE 702 may proceed with transmitting the second PSSCH transmission 725 (e.g., at the time and frequency resource reserved or indicated in the first PSSCH transmission 717) using the respective transmit beam, including transmitting one or more PSSCH transmissions with one or more respective transmit beams.

In some cases, in step 724, the second UE 704 may receive, from the first UE 702 using the second receive beam of the second UE 704, the second PSSCH transmission 725 of the second PSSCH burst. In some cases, the second PSSCH transmission 725 includes respective initial sidelink beamforming information, as described above. In some cases, the second UE 704 may monitor for and receive the second PSSCH transmission 725 based on the transmit beam information associated with the respective transmit beam of the first UE and resource reservation information indicated in sidelink control information (e.g., SCI-stage 1) received in the first PSSCH transmission 717 in step 716.

Thereafter, as shown in step 726, the second UE 704 may select a receive beam for sidelink communication, for example, based on the first PSSCH transmission 717 and the second PSSCH transmission 725. For example, in some cases, the second UE 704 may perform beam measurements associated with the first receive beam of the second UE 704 based on the first PSSCH transmission 717 and may also perform beam measurements associated with the second receive beam of the second UE 704 based on the second PSSCH transmission 725. Thereafter, the second UE 704 may select, based on beam measurements associated with the first receive beam and the beam measurements associated with the second receive beam, one of the first receive beam or the second receive beam for sidelink communication with the first UE 702. In some cases, the selected first receive beam or second receive beam may form a beam pair link (BPL) with the respective transmit beam of the first UE 702 that was used to transmit the first PSSCH transmission 717 and the second PSSCH transmission 725.

After selecting the receive beam for sidelink communication, the second UE 704 may transmit at least one response message to the first UE 702 in step 728 using a transmit beam of the second UE corresponding with the selected one of the first receive beam or the second receive beam. For example, the transmit beam of the second UE 704 used to transmit the at least one response message in step 728 may have a spatial correspondence or QCL relationship (e.g., QCL Type D) with the selected one of the first receive beam or the second receive beam.

In some cases, transmitting the at least one response message may be based on the respective initial sidelink beamforming information received using the selected one of the first receive beam of the second UE 704 (e.g., in the first PSSCH transmission 717) or the second receive beam of the second UE 704 (e.g., in the second PSSCH transmission 725). For example, based on the respective initial sidelink beamforming information received based on the selected one of the first receive beam or the second receive beam, the at least one response message indicates (e.g., via MAC CE or SCI) beam pairing or beam association information including at least one of (1) the selected transmit beam of one or more transmit beams of the first UE 702 or (2) the associated receive beam of the second UE 704 or (3) the corresponding transmit beam of the second UE 704. For another example, based on the respective initial sidelink beamforming information received based on the selected one of the first receive beam or the second receive beam, the at least one response message indicates (e.g., via DMRS or CSI-RS transmitted with the response message) beam pairing or beam association information (e.g., the configuration of the DMRS or CSI-RS transmitted with the response message associated with the configuration of the DMRS or CSI-RS transmitted with the initial beam forming transmission). Additionally, based on the respective initial sidelink beamforming information received based on the selected one of the first receive beam or the second receive beam, the at least one response message indicates (e.g., via MAC CE or SCI) resource information including at least one of preferred resources or non-preferred resources for respective beamforming confirmation message from the first UE 702. Further, in some cases, the second UE 704 may transmit the at least one response message using time-frequency resources indicated in the respective initial sidelink beamforming information included within the second PSSCH transmission 725 (e.g., the set of preferred time-frequency resources or set of non-preferred time-frequency resources, described above).

Further, as shown in step 730, the first UE 702 monitors for the at least one response message responding to the second PSSCH transmission 725 within the time-frequency resources indicated within the respective initial sidelink beamforming information included within the second PSSCH transmission 725. As described above, the first UE 702 may monitor for the at least one response message using a receive beam corresponding (e.g., QCL Type D relationship) to the transmit beam used to transmit the second PSSCH transmission 725.

Thereafter, as shown in step 732, in response to receiving the at least one response message from the second UE 704, the first UE 702 may transmit a confirmation message, using the selected or paired transmit beam based on the beam pairing or association information indicated in the respective response message from the second UE 704, at the resource based on the preferred or nonpreferred resources indicated in the respective response message from the second UE 704), to confirm successful completion of the initial sidelink beamforming procedure. Thereafter, as shown in step 734, the first UE 702 and the second UE 704 may communicate using, at least, the selected one of the first receive beam or second receive beam of the second UE 704 and the paired or associated transmit beam of the first UE 702 (e.g., that was used to transmit the first PSSCH transmission 717 and/or second PSSCH transmission 725). For example, in some cases, the first UE 702 and second UE 704 may continue with performing a discovery procedure or a direct communication link establishment procedure or may start beam fine-tuning procedure.

Additional Details Regarding Beam Correspondence and Association

Figure 8:
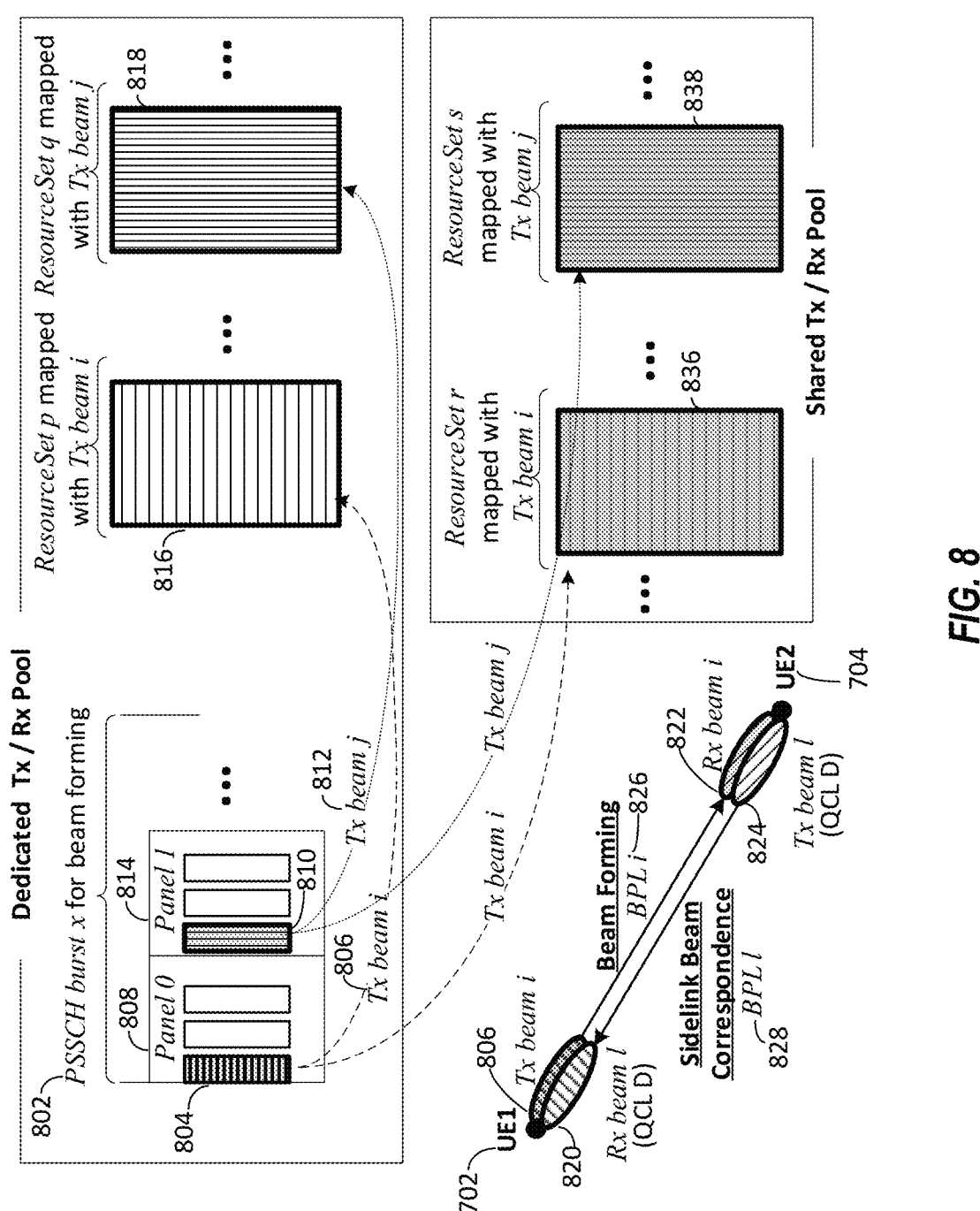
FIG. 8 illustrates beam association and correspondence between transmit beams and receive beams of a first user equipment and a second user equipment.

FIG. 8 illustrates beam association and correspondence between transmit beams and receive beams of the first UE 702 and second UE 704, as well as the mapping of time-frequency resources to these beams.

For example, as noted above, each PSSCH transmission of the one or more transmissions of the first PSSCH burst (and the second PSSCH burst) may be transmitted by the first UE 702 using different transmit beams, each transmit beam being associated with a particular antenna panel of the first UE 702 and with a different set of time-frequency resources for transmitting each PSSCH transmission. For example, as shown in FIG. 8, the first UE 702 may transmit a first PSSCH burst 802 (e.g., PSSCH burst x), which involves the transmission of at least a first PSSCH transmission 804 using a first transmit beam 806 (e.g., Tx beam i) associated with a first antenna panel 808. Additionally, transmission of the first PSSCH burst 802 includes the transmission of at least a second PSSCH transmission 810 using a second transmit beam 812 (e.g., Tx beam j) associated with a second antenna panel 814.

As shown, the first transmit beam 806 used to transmit the first PSSCH transmission 804 may be mapped to a first set of time-frequency resources, such as the set of time-frequency resources 816 or the set of time-frequency resources 836. As shown, depending on the sidelink resource pool allocation, the first set of time-frequency resources, such as the set of time-frequency resources 816, may comprise time-frequency resources from a dedicated Tx/Rx resource pool (e.g., ResourceSet p for beamforming, discovery or direct link establishment, etc.), such as when a dedicated resource pool is used to determine/select the resources for transmitting the PSSCH transmissions of the first PSSCH burst 802 or for transmitting the respective response message. In other cases, the first set of time-frequency resources, such as the set of time-frequency resources 836, may comprise time-frequency resources from a shared Tx/Rx resource pool (e.g., ResourceSet r shared with other sidelink communication for control or data messages), such as when a shared resource pool is used to determine/select the resources for transmitting the PSSCH transmissions of the first PSSCH burst 802 or for transmitting the respective response message.

Likewise, the second transmit beam 812 used to transmit the second PSSCH transmission 810 may be mapped to a second set of time-frequency resources, such as the set of time-frequency resources 818 or the set of time-frequency resources 838. As shown, depending on the sidelink resource pool allocation, the second set of time-frequency resources, such as the set of time-frequency resources 818, may comprise time-frequency resources from a dedicated Tx/Rx resource pool (e.g., ResourceSet q for beamforming, discovery or direct link establishment, etc.), such as when a dedicated resource pool is used to determine/select the resources for transmitting the PSSCH transmissions of the first PSSCH burst 802 or for transmitting the respective response message. In other cases, the second set of time-frequency resources, such as the set of time-frequency resources 838, may comprise time-frequency resources from a shared Tx/Rx resource pool (e.g., ResourceSet s shared with other sidelink communication for control or data messages), such as when a shared resource pool is used to determine/select the resources for transmitting the PSSCH transmissions of the first PSSCH burst 802 or for transmitting the respective response message.

As noted above, the first PSSCH transmission 804 may be transmitted by the first UE 702 using the first transmit beam 806 (e.g., Tx beam i) and the associated first set of time-frequency resources (e.g., the set of time-frequency resources 816 or the set of time-frequency resources 836). In some cases, as described above, the first transmit beam 806 may correspond with a first receive beam 820 (e.g., Rx beam l) of the first UE 702, which may be used to monitor for at least one response message responding to the first PSSCH transmission 804. In some cases, the first transmit beam 806 of the first UE 702 may correspond with the first receive beam 820 of the first UE 702 based on a QCL relationship, such as QCL Type D (e.g., the first transmit beam 806 and the first receive beam 820 have a same spatial direction).

Further, as shown, the second UE 704 may receive the first PSSCH transmission 804 using a second receive beam 822 (e.g., Rx beam i) of the second UE 704. In some cases, as described above, the second receive beam 822 of the second UE 704 may correspond with a second transmit beam 824 (e.g., Tx beam l) of the second UE 704, which may be used to transmit at least one response message responding to the first PSSCH transmission 804. In some cases, the second receive beam 822 of the second UE 704 may correspond with the second transmit beam 824 of the second UE 704 based on a QCL relationship, such as QCL Type D (e.g., the second Rx transmit beam 822 and the second transmit beam 824 have a same spatial direction).

Further, as shown, the first transmit beam 806 of the first UE 702 used to transmit the first PSSCH transmission 804 may be associated with the second receive beam 822 of the second UE 704 used to receive the first PSSCH transmission. As such, this association between the first transmit beam 806 of the first UE 702 and the second receive beam 822 of the second UE 704 may form a first beam pair link 826 (e.g., BPL i) between the first UE 702 and the second UE 704. Similarly, the first receive beam 820 of the first UE 702 used to receive the at least one response message may be associated with the second transmit beam 824 of the second UE 704 used to transmit the at least one response message. As such, this association between the first receive beam 820 of the first UE 702 and the second transmit beam 824 of the second UE 704 may form a second beam pair link 828 (e.g., BPL l) between the first UE 702 and the second UE 704.

Example Operations for Initial Sidelink Beamforming for Sidelink Resource Allocation Mode 1

Figure 9:
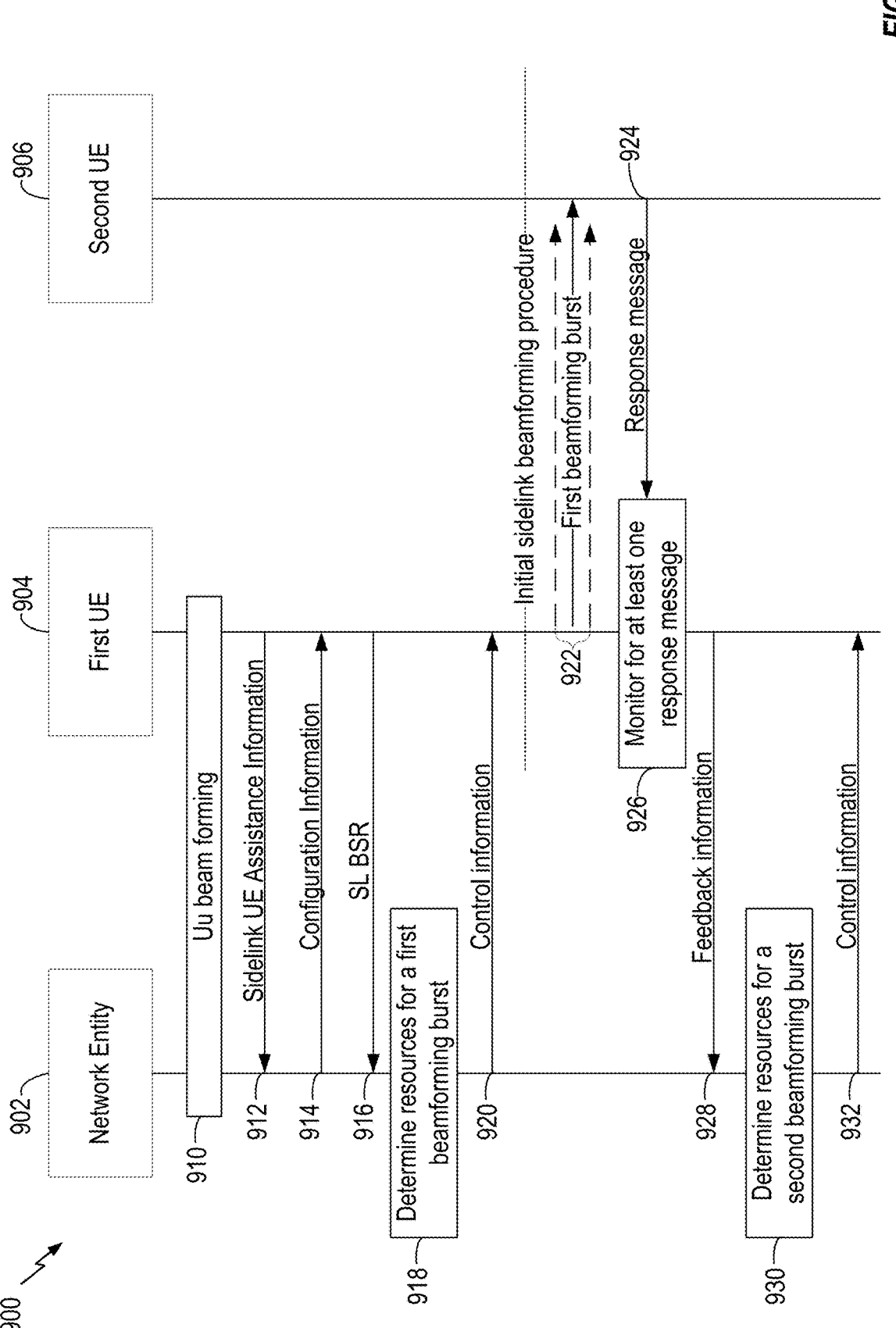
FIG. 9 depicts a process flow including operations for communication in a network between network entity, a first user equipment, and a second user equipment.

FIG. 9 depicts a process flow including operations 900 for communication in a network between, a network entity 902, a first UE 904, and a second UE 906. Both of the first UE 904 and second UE 906 may be sidelink UEs capable of communicating with each other using sidelink communications in an FR2 frequency band. In some cases, the first UE 904 and the second UE 906 may be an example of UE 104 depicted and described with respect to FIGS. 1 and 3. Additionally, in some cases, the network entity 902 may be an example of a base station, such as the BS 102 depicted and described with respect to FIGS. 1 and 3 or a disaggregated base station depicted and described with respect to FIG. 2.

The operations 900 presented below relate to an initial sidelink beamforming procedure to be performed based on sidelink resource allocation Mode 1 in which the network entity 902 is the entity that determines time-frequency resources for transmitting one or more beamforming bursts using S-RSB (as shown in FIG. 11) or PSSCH (as shown in FIG. 5A or FIG. 5B) and/or associated time-frequency resources for monitoring one or more beamforming responses respectively. For example, as will be described in greater detail below, the first UE 904 may receive configuration information and a set of time-frequency resources for performing an initial sidelink beamforming transmissions (e.g., S-RSB transmissions or PSSCH transmissions) and/or a set of time-frequency resources for monitoring respective beamforming responses from the network entity 902. The first UE 904 may then use the configuration information and the set of time-frequency resources to transmit one or more beamforming bursts, including one or more beamforming transmissions (e.g., S-RSB transmissions or PSSCH transmissions), and the set of time-frequency resources to monitor beamforming responses corresponding respectively to the one or more beamforming transmissions.

Operations 900 begin in step 910 with the network entity 902 and the first UE 904 optionally engaging in a beamforming procedure to establish one or more communication links on a Uu interface (e.g., between the network entity 902 and the first UE 904). Thereafter, in step 912, the first UE 904 transmits sidelink UE assistance information to the network entity 902. In some cases, the sidelink UE assistance information may include at least one of: a number of antenna panels of one or more antenna panels of the first UE 904, a number of transmit beams per antenna panel of the one or more antenna panels of the first UE 904, one or more transmit beam types supported by the one or more antenna panels of the first UE 904, or one or more beamforming burst parameters. In some cases, the one or more beamforming burst parameters may include at least one of a duration for transmitting a beamforming burst or a period or time interval between beamforming bursts. In some cases, the sidelink UE assistance information may include QoS profiles (e.g., including latency such as packet delay budget (PDB), reliability such as error rate, communication range, etc.) associated to one or more ProSe applications or V2X services using FR2 frequencies on sidelink, as well as a destination ID for a sidelink communication and/or associated communication type (e.g., broadcast, groupcast, or unicast).

Thereafter, as shown in step 914, the first UE 904 receives, from the network entity 902, configuration information indicating one or more configurations for an initial sidelink beamforming procedure involving one or more transmit beams of the first UE 904, each of the transmit beams associated with a respective antenna panel of the first UE 904. In some cases, the configuration information may be received in a radio resource control (RRC) message.

In some cases, the one or more configurations may each include a respective indication of at least one of: (1) a burst duration for transmitting one or more beamforming bursts, (2) a period or time interval between beamforming bursts, (3) a number of antenna panels to use for transmitting one or more beamforming bursts, (4) a number of transmit beams per antenna panel of the one or more antenna panels of the first UE to use for transmitting one or more beamforming bursts, (5) a number of transmit beams of each antenna panel of the one or more antenna panels of the first UE, (6) a total number of transmit beams across all antenna panels of the one or more antenna panels of the first UE, to use for transmitting one or more beamforming bursts, (7) a type of transmit beam of the one or more antenna panels to use for transmitting one or more beamforming bursts, or (8) a number of beamforming bursts to transmit.

In some cases, the one or more configurations may each include a respective indication of at least one of: (1) one or more configurations for time and frequency resources (e.g., resources allocated by configured grant using configured grant type 1 or resources further activated by DCI using configured grant type 2 or resources further dynamically indicated by DCI using dynamically scheduling) to be used for initial beamforming transmissions within one or more beamforming bursts, (2) one or more configurations for time and frequency resources (e.g., resources allocated by configured grant using configured grant type 1 or resources further activated by DCI using configured grant type 2 or resources further dynamically indicated by DCI using dynamically scheduling) to be used for responses respectively associated with initial beamforming transmissions of one or more beamforming bursts.

Thereafter, the first UE 904 may determine to perform the initial sidelink beamforming procedure. In some cases, the first UE 904 may determine to perform the sidelink beamforming procedure using similar techniques described above with respect to FIG. 7, such as based on whether or not the first UE 904 has received, from higher layers, a trigger to perform the initial sidelink beamforming procedure or an initial request for sidelink communication.

Based on the determination to perform the initial sidelink beamforming procedure or an initial request for sidelink communication, the first UE 904 may transmit, to the network entity 902, a request indicating the first UE 904 has one or more beamforming bursts to transmit, as shown in step 916. In some cases, the request transmitted in step 916 may comprise a sidelink buffer status report (SL BSR) requesting time-frequency resources for transmitting a first beamforming burst, for example, for transmitting one or more beamforming transmissions (e.g., S-RSB transmissions or PSSCH transmissions). In some cases, the SL BSR may include a flag that indicates that the requested resources are for transmitting the one or more beamforming transmissions (e.g., S-RSB transmissions or PSSCH transmissions). In some cases, the SL BSR may optionally include an indication of an antenna panel number or index to be used for transmitting the one or more beamforming transmissions and/or a beam number or index to be used for transmitting the one or more beamforming transmissions using S-RSB or PSSCH.

Thereafter, as illustrated in step 918, the network entity 902 determines a set of time-frequency resources for transmitting the first beamforming burst, and/or a set of time-frequency resources for respective beamforming response messages to the first beamforming burst. The network entity 902 may determine the set of time-frequency resources for transmitting the first beamforming burst according to sidelink resource allocation Mode 1. Additionally, the network entity 902 may determine the set of time-frequency resources for monitoring the respective beamforming response messages to the first beamforming burst according to sidelink resource allocation Mode 1.

At 920, the network entity 902 may then transmit control information to the first UE 904 indicating the set of time-frequency resources for transmitting the first beamforming burst and/or the set of time-frequency resources for respective beamforming responses to the first beamforming burst. In some cases, the control information, including the time-frequency resources, may be transmitted by the network entity 902 in a downlink control information (DCI) message (e.g., a dynamic grant based on the received SL BSR).

In some cases, traditional methods for indicating time-frequency resources for sidelink transmissions involve individually indicating each time-frequency resource that should be used for each different sidelink transmission. However, this traditional method for resource allocation may not be viable for allocating time-frequency resource for transmitting beamforming bursts or beamforming responses due to the large number of beamforming transmissions that may need to be transmitted within these beamforming bursts. For example, due to the large number of beamforming transmissions that may need to be transmitted within these beamforming bursts or beamforming responses respective to the beamforming transmissions within these beamforming bursts, an overhead associated with the allocation and indication of time-frequency resources may be too large to be transmitted within a DCI message.

Accordingly, rather than individually indicating time-frequency for each beamforming transmission, the indication of the set of time-frequency resources included within the control information may instead be used to derive the individual time-frequency resources for each beamforming transmission of the first beamforming burst transmitted using a first antenna panel, for example, based on a first subset of time-frequency resources allocated for transmitting a first beamforming transmission of the first beamforming burst. For example, in some cases, the indication of the set of time-frequency resources may comprise at least one of: (1) a first subset of time-frequency resources of the set of time-frequency resources for transmitting the first beamforming transmission of the first beamforming burst using a first transmit beam of a first antenna panel of the first UE 904, (2) a first time interval (e.g., transmit time gap) between adjacent beamforming transmissions, of the first beamforming burst, to be transmitted using different respective transmit beams of the first antenna panel, (3) a first number of the different respective transmit beams of the first antenna panel, (4) a first time period between transmission of a beamforming transmission using the first antenna panel and a response message associated with that beamforming transmission of the first antenna panel, and/or (5) a first configuration information index indicating a first configuration of the one or more configurations included the configuration information transmitted at 914.

In some aspects, time-frequency resources for beamforming transmissions to be transmitted using the first antenna panel and/or time-frequency resources for respective response messages associated with these beamforming transmissions may be indicated with a resource configuration (e.g., configuration index or configuration table code point), for example, a configuration (e.g., configuration index or configuration table code point) indicating the one or more resource configurations included at least one of (1) a resource configuration (e.g., an index or code point of a table) for the beamforming transmissions using the first antenna panel, (2) a resource configuration (e.g., an index or code point of a table) for the respective responses associated to beamforming transmissions using the first antenna panel or (3) a joint resource configuration (e.g., an index or code point of a joint table) for both the beamforming transmissions and the respective responses associated to beamforming transmissions using the first antenna panel. In some cases, the indicating the time-frequency resources for the beamforming transmissions to be transmitted using the first antenna panel and/or the time-frequency resources for respective response messages may be included in the configuration information transmitted at 914.

Because the first UE 904 may include more than one antenna panel, transmission of the first beamforming burst may involve the transmission of beamforming transmissions using transmit beams associated with at least a second antenna panel. Accordingly, the indication of the set of time-frequency resources included within the control information may also comprise at least one of: (1) a second subset of time-frequency resources of the set of time-frequency resources for transmitting a first beamforming transmission (e.g., associated with the second antenna panel of the first UE 904) of the first beamforming burst using a first transmit beam of the second antenna panel of first UE 904, (2) a second time interval (e.g., transmit time gap) between adjacent beamforming transmissions, of the first beamforming burst, to be transmitted using different respective transmit beams of the second antenna panel, (3) a second number of the different respective transmit beams of the second antenna panel, (4) a second time period between transmission of a beamforming transmission using the second antenna panel and a response message associated with that beamforming transmission of the second antenna panel, and (5) a second configuration information index indicating a second configuration of the one or more configurations in the configuration information included the configuration information transmitted at 914.

In some aspects, time-frequency resources for beamforming transmissions to be transmitted using the second antenna panel and/or time-frequency resources for respective response messages associated with these beamforming transmissions may be indicated with a resource configuration (e.g., configuration index or configuration table code point), for example, a configuration (e.g., configuration index or configuration table code point) indicating the one or more resource configurations included at least one of (1) a resource configuration (e.g., an index or code point of a table) for the beamforming transmissions using the second antenna panel, (2) a resource configuration (e.g., an index or code point of a table) for the respective responses associated to beamforming transmissions using the second antenna panel or (3) a joint resource configuration (e.g., an index or code point of a joint table) for both the beamforming transmissions and the respective responses associated to beamforming transmissions using the second antenna panel. In some cases, the indicating the time-frequency resources for the beamforming transmissions to be transmitted using the second antenna panel and/or the time-frequency resources for respective response messages may be included in the configuration information transmitted at 914.

Accordingly, as described above, the first UE 904 may be indicated subsets of time-frequency resources used to transmit a first beamforming transmission using a first transmit beam for each different antennal panel of the first UE 904. The first UE 904 may then derive the time-frequency resources for all remaining beamforming transmissions to be transmitted using remaining transmit beams of each respective antenna panel based on the indicated subsets of time-frequency resources and the time intervals between adjacent beamforming transmissions of each antenna panel.

Additionally, the first UE 904 may be indicated subsets of time-frequency resources for monitoring for one or more response messages responding to the first beamforming transmission transmitted via each different antenna panel of the first UE 904. For example, the first UE 904 may determine the subset of time-frequency resources for monitoring for a response message responding to the first beamforming transmission transmitted via the first antenna panel of the first UE 904 based on the subset of time-frequency resources for transmitting the first beamforming transmission and based on the first time period (e.g., indicated in the control information received in step 920) between transmission of a beamforming transmission (e.g., the first beamforming transmission) using the first antenna panel and a response message associated with that beamforming transmission of the first antenna panel. The first UE 904 may then derive time-frequency resources for receiving response messages for all remaining beamforming transmissions based on the time-frequency resources used to transmit the remaining beamforming transmissions and the indicated first time period (e.g., between beamforming transmission and response message). The first UE 904 may apply similar techniques (e.g., using the indicated second time period between beamforming transmission and response message) to determine the time-frequency resources for monitoring for response messages responding to beamforming transmissions transmitted using the second antenna panel.

Figure 10:
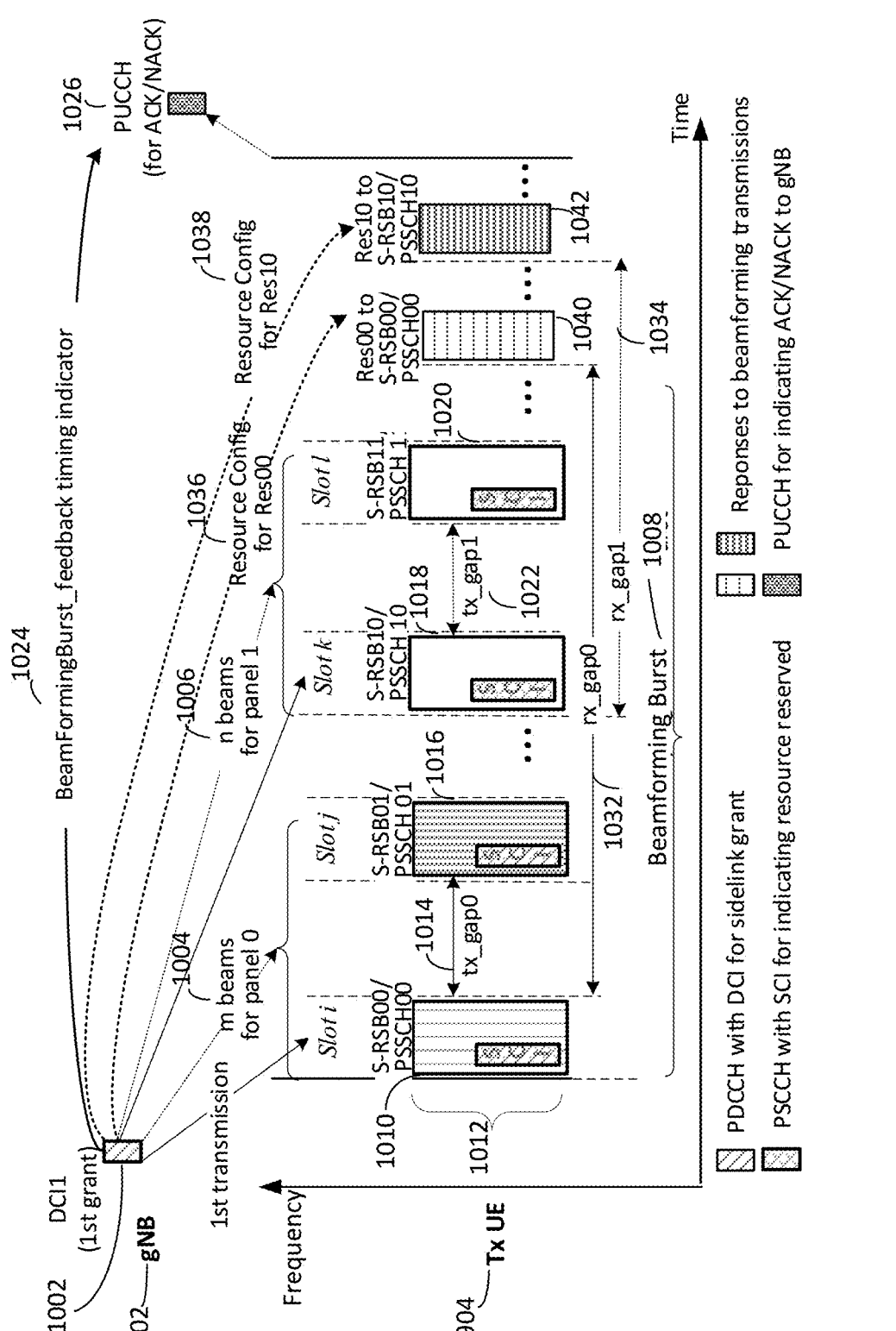
FIG. 10 provides an illustration of the allocation of time-frequency resources for transmitting beamforming transmissions within a beamforming burst.

FIG. 10 provides an illustration of the allocation of time-frequency resources for transmitting beamforming transmissions within a beamforming burst. For example, as illustrated, the network entity 902 (e.g., gNB) transmits control information 1002 (e.g., DCI 1 with a first grant) to the first UE 904 (e.g., Tx UE). The control information 1002, which may be an example of the control information transmitted by the network entity 902 at 920 in FIG. 9, may indicate a number of transmission beams per antenna panel for transmitting a first beamforming burst, such as a beamforming burst 1008 (e.g., using S-RSB or PSSCH). For example, the control information 1002 may indicate that m transmit beams are configured for transmitting beamforming transmissions of the beamforming burst 1008 using a first antenna panel (e.g., antenna panel 0) and n transmit beams are configured for transmitting the beamforming transmissions of the beamforming burst 1008 using a second antenna panel of the first UE 904 (e.g., antenna panel 1), as shown at 1004 and 1006, respectively. It should be noted that the beamforming burst illustrated in FIG. 10 is merely an example and other beamforming bursts may be used, such as one or more sidelink reference signal block (S-RSB) bursts.

As shown, a number of beamforming transmissions for transmission in the beamforming burst 1008 for each antenna panel of the first UE 904 may be equal to the total number of transmit beams configured for that antenna panel. Further, as shown, each beamforming transmission may be transmitted within a particular subset of time-frequency resources, which may be indicated within the control information 1002. For example, as shown, the control information 1002 may indicate a first subset of time-frequency resources for transmitting a first beamforming transmission 1010 (e.g., S-RSB00 or PSSCH 00) using a first transmit beam of the first antenna panel (e.g., antenna panel 0). For example, the control information 1002 may indicate to transmit the first beamforming transmission 1010 within slot i and frequency range 1012.

Additionally, the control information 1002 may indicate a first transmit time gap 1014 (e.g., tx_gap0) indicating a time between adjacent beamforming transmissions, such as between the first beamforming transmission 1010 (e.g., S-RSB00 or PSSCH 00) and a second beamforming transmission 1016 (e.g., S-RSB01 or PSSCH 01). Accordingly, based on the first subset of time-frequency resources for transmitting the first beamforming transmission 1010 (e.g., S-RSB00 or PSSCH 00) and on the indicated first transmit time gap 1014, the first UE 904 may determine a second subset of time-frequency resources for transmitting the second beamforming transmission 1016 (e.g., S-RSB01 or PSSCH 01) using a second transmit beam of the first antenna panel.

For example, the first UE 904 may determine to transmit the second beamforming transmission 1016 (e.g., S-RSB01 or PSSCH 01) within slot j and frequency range 1012. Additionally, the control information 1002 may indicate a first receive time gap 1032 (e.g., rx_gap0) indicating a time between the first beamforming transmission 1010 (e.g., S-RSB00 or PSSCH 00) and respective response 1040 (e.g., Res00).

Accordingly, based on the first subset of time-frequency resources for transmitting the first beamforming transmission 1010 (e.g., S-RSB00 or PSSCH 00) and on the indicated first receive time gap 1032 (e.g., rx_gap0), the first UE 904 may determine time-frequency resources for receiving or monitoring the respective response 1040 (e.g., Res00) responding to the first beamforming transmission 1010 (e.g., S-RSB00 or PSSCH 00) using a first receive beam corresponding to the first transmit beam for the first beamforming transmission 1010 of the first antenna panel.

Alternatively, the control information 1002 may indicate a first resource configuration 1036. The first resource configuration 1036 (e.g., Resource Config for Res00) may indicate the time-frequency resource (e.g., resource configuration index or resource configuration table code point) for the respective response to the first beamforming transmission 1010, such as the respective response 1040 (e.g., Res00) responding to the first beamforming transmission1010 (e.g., S-RSB00 or PSSCH 00). Accordingly, based on the first resource configuration 1036 (e.g., Resource Config for Res00), the first UE 904 may determine time-frequency resources for receiving or monitoring the respective response 1040 (e.g., Res00) responding to the first beamforming transmission 1010 (e.g., S-RSB00 or PSSCH 00) using a first receive beam corresponding to the first transmit beam for the first beamforming transmission of the first antenna panel. In some aspects, the first resource configuration 1036 may indicate joint resources (e.g., joint resource configuration index or joint resource configuration table code point) for jointly both the first beamforming transmission and the respective response 1040 responding to the first beamforming transmission 1010 of the first antenna panel.

Similarly, the control information 1002 may indicate third subset of time-frequency resources for transmitting a first beamforming transmission 1018 (e.g., S-RSB10 or PSSCH 10) using a first transmit beam of the second antenna panel (e.g., antenna panel 1). The first UE 904 may then determine a fourth subset of time-frequency resources for transmitting a second beamforming transmission 1020 (e.g., S-RSB11 or PSSCH 11) using a second transmit beam of the second antenna panel based on the indicated third subset of time-frequency resources and a second transmit time gap 1022 (e.g., tx_gap1) indicated in the control information 1002. Additionally, the control information 1002 may indicate a second receive time gap 1034 (e.g., rx_gap1) indicating a time between the first beamforming transmission 1018 (e.g., S-RSB10 or PSSCH 10) and respective response 1042 (e.g., Res10).

Accordingly, based on the third subset of time-frequency resources for transmitting the first beamforming transmission 1018 (e.g., S-RSB10 or PSSCH 10) and on the indicated second receive time gap 1034 (e.g., rx_gap1), the first UE 904 may determine time-frequency resources for receiving or monitoring the respective response 1042 (e.g., Res10) responding to the first beamforming transmission 1018 (e.g., S-RSB10 or PSSCH 10) using a second receive beam corresponding to the second transmit beam for the first beamforming transmission of the second antenna panel.

Alternatively, the control information 1002 may indicate a second resource configuration 1038. The second resource configuration 1038 (e.g., Resource Config for Res10) may indicate the time-frequency resource (e.g., resource configuration index or resource configuration table code point) for the respective response 1042 (e.g., Res10) responding to the first beamforming transmission 1018 (e.g., S-RSB10 or PSSCH 10). Accordingly, based on the second resource configuration 1038 (e.g., Resource Config for Res10), the first UE 904 may determine time-frequency resources for receiving or monitoring the respective response 1042 (e.g., Res10) responding to the first beamforming transmission 1018 (e.g., S-RSB10 or PSSCH 10) using a second receive beam corresponding to the second transmit beam for the first beamforming transmission of the second antenna panel. In some aspects, the second resource configuration 1038 may indicate joint resources (e.g., joint resource configuration index or joint resource configuration table code point) for jointly both the first beamforming transmission and the respective response to the first beamforming transmission of the second antenna panel.

Additionally, as shown, the control information 1002 may also include a feedback timing indicator 1024. The feedback timing indicator 1024 may indicate a time to transmit, to the network entity 902, feedback information 1026 associated with the control information 1002. As shown, the feedback information may be transmitted on a physical uplink control channel (PUCCH) or a physical uplink shared channel (PUSCH) and may include an acknowledgement (ACK) or a negative acknowledgement (NACK).

Returning to FIG. 9, after receiving the control information at 920 (e.g., control information 1002 illustrated in FIG. 10), the first UE 904 may then perform the initial sidelink beamforming procedure based, at least in part, on the configuration information received at 914 and on the control information received at 920. For example, performing the initial sidelink beamforming procedure may involve transmitting, at 922, at least a first beamforming burst, which may include transmitting each beamforming transmission of one or more beamforming transmissions using a different respective transmit beam of the one or more transmit beams of one or more antenna panels of the first UE 904. In some cases, the one or more beamforming transmissions comprise at least one of one or more PSSCH transmissions or one or more S-RSBs. In some cases, each of the one or more S-RSBs may include at least one reference signal and sidelink control information. Additional details regarding S-RSBs are provided below in FIG. 11.

Transmitting the first beamforming burst may include transmitting, in a first subset of time-frequency resources as indicated in the control information received at 920, a first beamforming transmission via a first transmit beam of the first antenna panel based on a first configuration indicated in the control information. Thereafter, the first UE 904 may transmit, based on the first configuration, at least a second beamforming transmission. The second beamforming transmission may be transmitted using a second transmit beam of the different respective transmit beams of the first antenna panel in a second subset of time-frequency resources of the set of time-frequency resources that occur a first transmit time gap (e.g., indicated in the control information) following transmission of the first beamforming transmission. Additionally, the first UE 904 may indicate in SCI (e.g., first stage SCI) the reserved resources or reservation interval (e.g., indicated in the received in DCI) for the first beamforming transmission in the next beamforming burst with the first antenna panel, and/or indicate the initial beamforming information (e.g., beamforming info and resources info) in the MAC CE(s) or SCI (e.g., second stage SCI), as described with details in FIG. 6.

Thereafter, the first UE 904 may begin transmitting beamforming transmissions of the first beamforming burst using a second antenna panel. For example, the first UE 904 may transmit, using a third subset of time-frequency resources indicated within the control information received at 920, a third beamforming transmission via a third transmit beam of the second antenna panel based on a second configuration indicated within the control information. The first UE 904 may then transmit, based on the second configuration, at least a fourth beamforming transmission. The fourth beamforming transmission may be transmitted by the first UE 904 using a fourth transmit beam of the different respective transmit beams of the second antenna panel in a fourth subset of time-frequency resources of the set of time-frequency resources that occur after a second time interval (e.g., indicated in the control information) following transmission of the second beamforming transmission. Additionally, the first UE 904 may indicate in the SCI (e.g., first stage SCI) with the reserved resources or reservation interval (e.g., indicated in the received in DCI) for the first beamforming transmission in the next beamforming burst with the second antenna panel, and/or indicate the initial beamforming information (e.g., beamforming info and resources info) in the MAC CE(s) or SCI (e.g., second stage SCI), as described with details in FIG. 6.

In some cases, each of the beamforming transmissions transmitted by the first UE 904 may include similar information as described above with respect to the beamforming transmissions transmitted based on the sidelink resource allocation Mode 2 described above. For example, in some cases, each of the beamforming transmissions transmitted by the first UE 904 may include respective initial sidelink beamforming information, indicating transmit beam information associated with a transmit beam used to transmit that beamforming transmission and at least one of a set of preferred time-frequency resources for transmitting at least one response message responding to that beamforming transmission or a set of non-preferred time-frequency resources to avoid using to transmit the at least one response message responding to that beamforming transmission.

Accordingly, the second UE 906 may receive at least one of the beamforming transmissions transmitted by the first UE 904 and may use the respective initial sidelink beamforming information within the at least one beamforming transmission to transmit, at 924, at least one response message to the first UE 904, for example, using similar techniques as described above with respect to steps 718, 720, 726, and 728 of FIG. 7. Additionally, as shown in step 926, the first UE 904 may monitor for and receive the at least one response message from the second UE 906, for example, using similar techniques as described above with respect to steps 720, 722, 728, and 730 of FIG. 7. In some cases, the first UE 904 may monitor for the at least one response message based on time-frequency resources for receiving the at least one response message derived or determined based on information in the control information (e.g., received at 920 or in the configuration information received at 914), such as the subsets of time-frequency resources for transmitting the first beamforming transmission via each different antenna panel and/or the first time period and second time period between beamforming transmission and response message.

In some cases, after transmitting the first beamforming burst, the first UE 904 may be configured to transmit, to the network entity 902, feedback information associated with the control information (e.g., received at 920), as shown at 928. In some cases, the first UE 904 may transmit the feedback information based on a feedback timing indicator included within the control information. The feedback timing indicator (e.g., BeamFormingBurst_feedback timing indicator 1024 in FIG. 10) may indicate a time to transmit the feedback information associated with the control information.

In some cases, the feedback information may include ACK/NACK information. In some cases, an ACK included in the feedback information may be configured to indicate to the network entity 902 that another beamforming burst is not necessary. In some cases, a NACK in the feedback information may be configured to indicate to the network entity that transmission of at least a second beamforming burst is requested.

Accordingly, in some cases, the first UE 904 may be configured to include the NACK in the feedback information. In such cases, in step 930, the network entity 902 may be configured to determine additional time-frequency resources for the transmission of at least a second beamforming burst, for example, using similar techniques as described above with respect to step 918. Thereafter, as shown in step 932, the first UE 904 may receive, based on the NACK, additional control information (e.g., a second DCI) indicating resources for transmitting a second beamforming burst. The first UE 904 may then transmit the second beamforming burst based on the indicated resources for transmitting the second beamforming burst.

In some cases, the first UE 904 may be configured to include the NACK in the feedback information based on one of: the response message received from the second UE 906 at 924 indicating to transmit the second beamforming burst or failing to receive a response message from the second UE 906, responding to at least one beamforming transmission of the one or more beamforming transmissions transmitted by the first UE 904, within a threshold amount of time or at the indicated resources for respective responses to beamforming transmissions in a burst.

In some cases, the first UE 904 may include the ACK in the feedback information transmitted to the network entity in step 928. In some cases, the first UE 904 may be configured to include the ACK (e.g., to indicate additional beamforming bursts are not necessary, based on the response message received from the second UE 906 indicating a beam pair link between one of the one or more transmit beams of the first UE 904 and a receive beam of the second UE 906 or based on the first UE 904 decision (e.g., no more beamforming transmissions in one or more beamforming bursts).

As noted above, the first UE 904 may receive control information at 920 that indicates a set of time-frequency resources for transmitting the first beamforming burst. In some cases, the indication of the set of time-frequency resources may be included in a dynamic grant (DG) included within a DCI message. In this case, the set of time-frequency resources may only be used by the first UE 904 to transmit the first beamforming burst. As a result, additional time-frequency resources may need to be allocated by the network entity 902 for the transmission of any additional beamforming bursts. In other cases, the set of time-frequency resources for transmitting the first beamforming burst may comprise a set of semi-static time-frequency resources that may be used by the first UE 904 to transmit the first beamforming burst as well as one or more additional beamforming bursts. In this case, the set of time-frequency resources for transmitting the first beamforming burst may be included within a configured grant (CG) transmitted, for example, within the configuration information at 914. In some cases, the set of time-frequency resources may be indicated within an RRC message (e.g., configured grant type 1) or activation DCI (e.g., configured grant type 2) received from the network entity 902, activating one or more configured grant configurations received in the configuration information (e.g., at 914).

Additional Details Regarding S-RSBs

FIG. 11 provides an illustration of two different types of S-RSBs that may be used when performing an initial sidelink beamforming procedure. As noted above, each S-RSB may include at least one RS and SCI that other UEs may use for beam management (e.g., using the RS) and resource sensing for beam sweeping or sidelink communication (e.g., based at least in part on the resource reservation indicated in the SCI). For example, S-RSB 1102 is 3 symbols and includes a first RS that may be used for automatic gain control (AGC), a one-symbol SCI, and a second RS for other beam management operations. The second RS may be used for beamforming, beam fine tuning, and/or beam measurement. The second RS may be the same as the first RS or different than the first RS. The first RS and/or the second RS may be a Zadoff-Chu (ZC) sequence or an m-sequence mapped to each resource element or sub-carrier of x physical resource blocks (PRBs) or sub-channels, similar to a Uu synchronization signal. The RS may be a pseudo-random sequence mapped continuously (e.g., density as 1) or discontinuously over y PRBs or sub-channels (e.g., even PRBs with density 0.5), similar to a Uu CSI-RS.

The SCI may indicate time-frequency resources reserved for one or more S-RSB transmissions, respectively. The SCI may indicate time-frequency resources used for semi-persistent scheduling (SPS) of future S-RSBs (e.g., indicated with a reservation interval), such that other UEs are aware of the transmission pattern of the S-RSBs. The other UEs may select resources to schedule transmissions and/or receptions around the S-RSBs (e.g., based on the reserved resources or the reservation interval for SPS in the SCI of a received S-RSB transmission of a S-RSB burst) to avoid transmission collisions (e.g., collisions between S-RSB bursts from different UEs or collisions between S-RSB bursts and other sidelink communications such as beam report from different UEs).

The SCI may include beam information (e.g., transmission configuration indicator (TCI) state with quasi-co-location (QCL) types such as type A or type D or spatial filter for special receive beam parameter or for beam association or correspondence, a beam identifier or beam index of a beam used to transmit the S-RSB for beam association or resource mapping) and S-RSB information (e.g., S-RSB index of an S-RSB within an S-RSB burst for beam association or resource mapping, S-RSB structure or configuration for a UE to identify the proper S-RSB burst). The S-RSB structure or configuration information may include an S-RSB configuration index (e.g., a codepoint of S-RSB burst duration and S-RSB burst period combined, based at least in part on a numerology configured for a sidelink BWP).

The SCI may include a source identifier (ID), such as a Layer 1 (L1) source ID for identifying the transmitter of the one or more S-RSB bursts. For example, an Rx UE may determine whether to pair a receive beam with the Tx UE's transmit beam and whether to report the beam measurement to the Tx UE based at least in part on the Tx UE's ID). The SCI may include a destination ID, such as an L1 destination ID for identifying an Rx UE with which the Tx UE may conduct beam sweeping for transmitting beam fine tuning or receiving beam fine tuning). The SCI may indicate a type of beam management operation, whether initial beamforming, beam fine tuning of transmit (Tx) beams, beam fine tuning of receive (Rx) beams, beam measurements, or beam recovery (e.g., an Rx UE may detect the proper S-RSB bust(s) for beamforming or beam fine tuning).

In another example, S-RSB 1104 spans 4 symbols and includes 2 symbols of SCI. The SCI may include SCI part 1 (e.g., first stage SCI) and SCI part 2 (e.g., second stage SCI). The SCI part 2 may indicate preferred resources or non-preferred resources associated with the S-RSB of an S-RSB burst. Alternatively, the SCI part 2 may include the source ID, the destination ID, and/or other identifiers or information for a beam management operation. If the S-RSB is 4 symbols, the SCI part 2 may be included in the third symbol (and possibly part of the second symbol). The second RS may be included in the fourth symbol.

Example Operations

FIG. 12 shows an example of a method 1200 of wireless communication by a first UE, such as a UE 104 of FIGS. 1 and 3 and/or the first UE 702 described with respect to FIG. 7.

Method 1200 begins at step 1205 with determining one or more parameters for an initial sidelink beamforming procedure involving one or more transmit beams, each of the transmit beams associated with a respective antenna panel of the first UE. In some cases, the operations of this step refer to, or may be performed by, circuitry for determining and/or code for determining as described with reference to FIG. 16.

Method 1200 then proceeds to step 1210 with performing, using the one or more parameters, the initial sidelink beamforming procedure, comprising: transmitting at least a first PSSCH burst, comprising transmitting each PSSCH transmission of one or more PSSCH transmissions using a different respective transmit beam of the one or more transmit beams, wherein each PSSCH transmission of the one or more PSSCH transmissions includes respective initial sidelink beamforming information; monitoring, based on the initial sidelink beamforming information, for at least one response message from a second UE responding to at least one of the one or more PSSCH transmissions; and taking one or more actions based on the monitoring. In some cases, the operations of this step refer to, or may be performed by, circuitry for performing and/or code for performing as described with reference to FIG. 16.

In some aspects, the one or more parameters comprise at least one of a duration of the at least the first PSSCH burst, a periodicity associated with the at least the first PSSCH burst, or a time interval between PSSCH bursts of the at least the first PSSCH burst.

In some aspects, the duration of at least the first PSSCH burst is based on at least one of: a number of antenna panels a sidelink communication or sidelink beamforming; or a number of transmit beams for initiating a sidelink communication or sidelink beamforming.

In some aspects, at least one of: the number of antenna panels a sidelink communication or sidelink beamforming is pre-configured in memory of the first UE, received in configuration from a network entity, or determined by the first UE; or the number of transmit beams a sidelink communication or sidelink beamforming is pre-configured in memory of the first UE, received in configuration from a network entity, or determined by the first UE.

In some aspects, at least one of the periodicity or the time interval is determined based on at least one of: pre-configuration information stored in memory of the first UE; configuration information received from a network entity; a timing requirement associated with the initial sidelink beamforming procedure; or a timing requirement associated with an initial request for sidelink communication indicated within the one or more PSSCH transmissions.

In some aspects, the method 1200 further includes determining, in a MAC layer of the first UE, that data has been obtained from a higher layer indicating a LCID associated with an initial request for sidelink communication. In some cases, the operations of this step refer to, or may be performed by, circuitry for determining and/or code for determining as described with reference to FIG. 16.

In some aspects, the one or more PSSCH transmissions further include the initial request for sidelink communication.

In some aspects, the initial request for sidelink communication comprises at least one of a sidelink application identifier, a service type identifier, or an identifier for one or more UEs.

In some aspects, the initial request for sidelink communication comprises one of a ProSe discovery request message, a direct communication request, or a beamforming MAC-CE.

In some aspects, the method 1200 further includes selecting, in a MAC layer of the first UE, a set of time-frequency resources for transmitting at least the first PSSCH burst. In some cases, the operations of this step refer to, or may be performed by, circuitry for selecting and/or code for selecting as described with reference to FIG. 16.

In some aspects, the set of time-frequency resources are included in one of a continuous set of slots or a discontinuous set of slots.

In some aspects, selecting the set of time-frequency resources for transmitting the first PSSCH burst is based on a number of antenna panels for initiating a sidelink communication or sidelink beamforming and a number of transmit beams for initiating a sidelink communication or sidelink beamforming.

In some aspects, for each PSSCH transmission of the one or more PSSCH transmissions, the respective initial sidelink beamforming information for that PSSCH transmission comprises: transmit beam information associated with a transmit beam for transmitting that PSSCH transmission; and at least one of: a set of preferred time-frequency resources for transmitting the at least one response message; or a set of non-preferred time-frequency resources to avoid using to transmit the at least one response message.

In some aspects, the transmit beam information associated with the transmit beam for transmitting that PSSCH transmission includes at least one of: a transmit beam ID of the transmit beam; an index within at least the first PSSCH burst that identifies the transmit beam; a TCI state associated with the transmit beam; or a spatial filter associated with the transmit beam.

In some aspects, the respective initial sidelink beamforming information is transmitted, in the one or more PSSCH transmissions, in at least one of: one or more a MAC-CEs; or second stage SCI.

In some aspects, the method 1200 further includes generating, in a MAC layer of the first UE, one or more MAC PDUs, wherein: each different MAC PDU of the one or more MAC PDUs corresponds to a respective PSSCH transmission of the one or more PSSCH transmissions; and each MAC PDU includes, at least, the respective initial sidelink beamforming information corresponding to the respective PSSCH transmission. In some cases, the operations of this step refer to, or may be performed by, circuitry for generating and/or code for generating as described with reference to FIG. 16.

In some aspects, the method 1200 further includes sending the one or more MAC PDUs from the MAC layer of the first UE to a physical layer of the first UE for transmission in the one or more PSSCH transmissions. In some cases, the operations of this step refer to, or may be performed by, circuitry for sending and/or code for sending as described with reference to FIG. 16.

In some aspects, the method 1200 further includes sending, from the MAC layer of the first UE to the physical layer of the first UE, information indicating that the one or more MAC PDUs correspond to at least the first PSSCH burst. In some cases, the operations of this step refer to, or may be performed by, circuitry for sending and/or code for sending as described with reference to FIG. 16.

In some aspects, the information further indicates a beam type for transmitting the one or more MAC PDUs in the one or more PSSCH transmissions.

In some aspects, the beam type comprises one of a wide transmit beam, a medium transmit beam, or a narrow transmit beam; and the beam type is based on at least one of a communication range for sidelink communication or a level of mobility associated with the first UE.

In some aspects, the method 1200 further includes sending, from the MAC layer of the first UE to the physical layer of the first UE, for each MAC PDU of the one or more MAC PDUs, information indicating: transmit beam information associated with the different respective transmit beam to be used to transmit a first PSSCH transmission, of the one or more PSSCH transmissions, in which that MAC PDU is to be included; and at least one of: a set of preferred time-frequency resources for transmitting the at least one response message corresponding the first PSSCH transmission including that MAC PDU; or a set of non-preferred time-frequency resources to avoid using to transmit the at least one response message corresponding the first PSSCH transmission including that MAC PDU. In some cases, the operations of this step refer to, or may be performed by, circuitry for sending and/or code for sending as described with reference to FIG. 16.

In some aspects, each different respective transmit beam of the one or more transmit beams is associated with a respective receive beam of one or more receive beams; and each respective receive beam is associated with a respective subset of time-frequency resources, of a set of time-frequency resources, to use to monitor for the at least one response message.

In some aspects, monitoring for the at least one response message comprises monitoring each respective subset of time-frequency resources using each respective receive beam for the at least one response message.

In some aspects, the method 1200 further includes receiving, from the second UE based on the monitoring, the at least one response message using a first receive beam of one or more receive beams. In some cases, the operations of this step refer to, or may be performed by, circuitry for receiving and/or code for receiving as described with reference to FIG. 16.

In some aspects, the at least one response message comprises at least one of a discovery response, a direct communication response, an ACK message, or a NACK message.

In some aspects, at least one response message indicates a first transmit beam of the one or more transmit beams; and taking the one or more actions comprises communicating with the second UE using the first transmit beam and the first receive beam.

In some aspects, taking the one or more actions comprises transmitting at least a second PSSCH burst based on the monitoring.

In some aspects, transmitting at least a second PSSCH burst is further based on one of: receiving the at least one response message including NACK or a request to transmit at least the second PSSCH burst; or failing to receive the at least one response message within a threshold amount of time.

Figure 16:
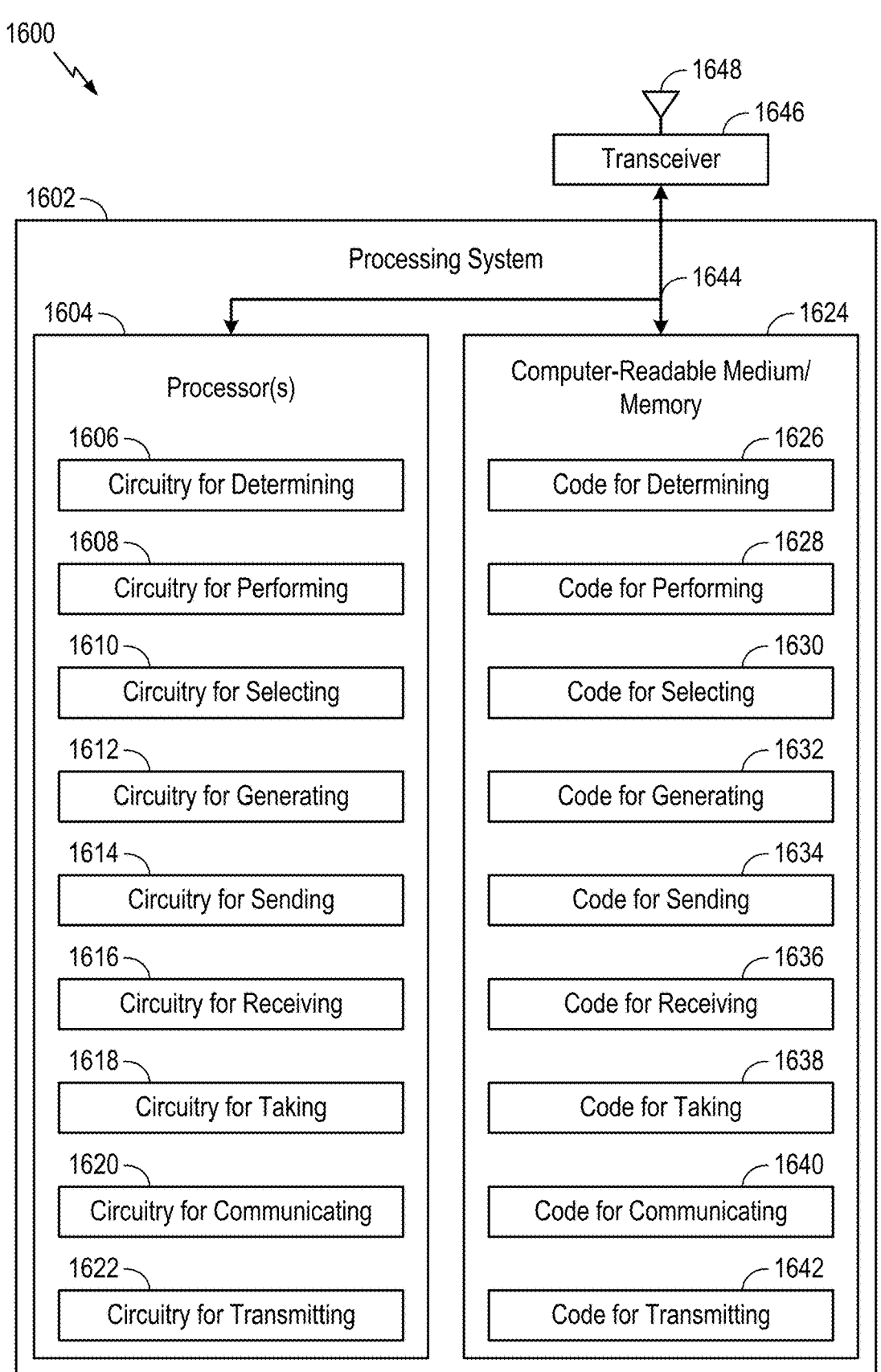
FIG. 16 depicts aspects of an example communications device.

In one aspect, method 1200, or any aspect related to it, may be performed by an apparatus, such as communications device 1600 of FIG. 16, which includes various components operable, configured, or adapted to perform the method 1200. Communications device 1600 is described below in further detail.

Note that FIG. 12 is just one example of a method, and other methods including fewer, additional, or alternative steps are possible consistent with this disclosure.

FIG. 13 shows an example of a method 1300 of wireless communication by a second UE, such as a UE 104 of FIGS. 1 and 3 and/or the second UE 704 described with respect to FIG. 7.

Method 1300 begins at step 1305 with receiving, from a first UE using a first receive beam of the second UE, a first PSSCH transmission of a first PSSCH burst, wherein: the first PSSCH transmission is associated with a respective transmit beam of one or more transmit beams of the first UE; and the first PSSCH transmission of the one or more PSSCH transmissions includes respective initial sidelink beamforming information. In some cases, the operations of this step refer to, or may be performed by, circuitry for receiving and/or code for receiving as described with reference to FIG. 16.

Method 1300 then proceeds to step 1310 with taking one or more actions based on the first PSSCH transmission. In some cases, the operations of this step refer to, or may be performed by, circuitry for taking and/or code for taking as described with reference to FIG. 16.

In some aspects, the respective initial sidelink beamforming information included in the first PSSCH transmission comprises: transmit beam information associated with the respective transmit beam of the first UE used for transmitting the first PSSCH transmission; and at least one of: a set of preferred time-frequency resources for transmitting at least one response message; or a set of non-preferred time-frequency resources to avoid using to transmit at least one response message.

In some aspects, the transmit beam information associated with the respective transmit beam of the first UE used for transmitting the first PSSCH transmission includes at least one of: a transmit beam ID of the respective transmit beam; an index within the first PSSCH burst that identifies the respective transmit beam; a TCI state associated with the respective transmit beam; or a spatial filter associated with the respective transmit beam.

In some aspects, the respective initial sidelink beamforming information is received, in the first PSSCH transmission, in at least one of: one or more a MAC-CEs; or second stage SCI.

In some aspects, taking the one or more actions comprises transmitting, using a first transmit beam of the second UE, at least one response message to the first UE based on the respective initial sidelink beamforming information included in the first PSSCH transmission; and the first transmit beam of the second UE corresponds to the first receive beam of the second UE.

In some aspects, transmitting the at least one response message comprises transmitting the response message in a sub-set of time-frequency resources according to one of the set of preferred time-frequency resources or the set of non-preferred time-frequency resources.

In some aspects, the at least one response message indicates at least one of: the respective transmit beam of one or more transmit beams of the first UE; or the first receive beam of the second UE.

In some aspects, the method 1300 further includes communicating with the first UE using the first transmit beam of the second UE and the first receive beam of the second UE. In some cases, the operations of this step refer to, or may be performed by, circuitry for communicating and/or code for communicating as described with reference to FIG. 16.

In some aspects, taking the one or more actions based on the first PSSCH transmission comprises determining whether to receive at least a second PSSCH transmission of a second PSSCH burst using a second receive beam of the UE.

In some aspects, the first PSSCH transmission includes an initial request for sidelink communication.

In some aspects, the initial request for sidelink communication includes at least one of a sidelink application identifier, a service type identifier, or an identifier for one or more UEs; and determining whether to receive at least the second PSSCH transmission is based on the at least one of the sidelink application identifier, the service type identifier, or the identifier for one or more UEs.

In some aspects, the initial request for sidelink communication comprises one of a ProSe discovery request message, a direct communication request, or a beamforming MAC-CE.

In some aspects, the method 1300 further includes performing beam measurements associated with the first receive beam based on the first PSSCH transmission, wherein determining whether to receive at least the second PSSCH transmission is based on the beam measurements. In some cases, the operations of this step refer to, or may be performed by, circuitry for performing and/or code for performing as described with reference to FIG. 16.

In some aspects, the beam measurements comprise SL RSRP measurements.

In some aspects, determining whether to receive at least the second PSSCH transmission comprises determining to receive at least the second PSSCH transmission when the beam measurements are less than a threshold.

In some aspects, when it is determined to receive at least the second PSSCH transmission, taking the one or more actions further comprises receiving, from the first UE using a second receive beam of the second UE, the second PSSCH transmission of a second PSSCH burst; and the second PSSCH transmission includes respective initial sidelink beamforming information.

In some aspects, receiving the second PSSCH transmission is based on transmit beam information associated with the respective transmit beam of the first UE and resource reservation information indicated in sidelink control information received in the first PSSCH transmission.

In some aspects, in order to receive the second PSSCH transmission, the method 1300 further includes: transmitting at least one response message including NACK or a request to transmit at least the second PSSCH burst; or not transmitting at least one response message within a threshold amount of time.

In some aspects, the method 1300 further includes performing beam measurements associated with the first receive beam based on the first PSSCH transmission. In some cases, the operations of this step refer to, or may be performed by, circuitry for performing and/or code for performing as described with reference to FIG. 16.

In some aspects, the method 1300 further includes performing beam measurements associated with the second receive beam based on the second PSSCH transmission. In some cases, the operations of this step refer to, or may be performed by, circuitry for performing and/or code for performing as described with reference to FIG. 16.

In some aspects, the method 1300 further includes selecting, based on beam measurements associated with the first receive beam and the beam measurements associated with the second receive beam, one of the first receive beam or the second receive beam for sidelink communication with the first UE. In some cases, the operations of this step refer to, or may be performed by, circuitry for selecting and/or code for selecting as described with reference to FIG. 16.

In some aspects, taking the one or more actions comprises transmitting at least one response message to the first UE using a first transmit beam of the second UE corresponding with the selected one of the first receive beam or the second receive beam.

In some aspects, the at least one response message indicates at least one of: the respective transmit beam of one or more transmit beams of the first UE; or the selected one of the first receive beam of the second UE or the second receive beam of the second UE.

In some aspects, transmitting the at least one response message is based on the respective initial sidelink beamforming information received using the selected one of the first receive beam of the second UE or the second receive beam of the second UE.

In one aspect, method 1300, or any aspect related to it, may be performed by an apparatus, such as communications device 1600 of FIG. 16, which includes various components operable, configured, or adapted to perform the method 1300. Communications device 1600 is described below in further detail.

Note that FIG. 13 is just one example of a method, and other methods including fewer, additional, or alternative steps are possible consistent with this disclosure.

FIG. 14 shows an example of a method 1400 of wireless communication by a first UE, such as a UE 104 of FIGS. 1 and 3 and/or the first UE 904 described with respect to FIG. 9.

Method 1400 begins at step 1405 with receiving, from a network entity, configuration information indicating one or more configurations for an initial sidelink beamforming procedure involving one or more transmit beams of the first UE, each of the transmit beams associated with a respective antenna panel of the first UE. In some cases, the operations of this step refer to, or may be performed by, circuitry for receiving and/or code for receiving as described with reference to FIG. 16.

Method 1400 then proceeds to step 1410 with performing, based on the configuration information, the initial sidelink beamforming procedure, comprising: transmitting at least a first beamforming burst, comprising transmitting each beamforming transmission of one or more beamforming transmissions using a different respective transmit beam of the one or more transmit beams of one or more antenna panels of the first UE; monitoring for at least one response message from a second UE responding to at least one of the one or more beamforming transmissions; and taking one or more actions based on the monitoring. In some cases, the operations of this step refer to, or may be performed by, circuitry for performing and/or code for performing as described with reference to FIG. 16.

In some aspects, the one or more beamforming transmissions comprise at least one of one or more PSSCH transmissions or one or more S-RSBs.

In some aspects, the method 1400 further includes transmitting, to the network entity, sidelink assistance information, wherein the configuration information for the initial sidelink beamforming procedure is based on the sidelink assistance information. In some cases, the operations of this step refer to, or may be performed by, circuitry for transmitting and/or code for transmitting as described with reference to FIG. 16.

In some aspects, the sidelink assistance information comprises at least one of: a number of antenna panels of the one or more antenna panels of the first UE; a number of transmit beams per antenna panel of the one or more antenna panels of the first UE; one or more transmit beam types supported by the one or more antenna panels of the first UE; or one or more beamforming burst parameters, including at least one of a duration for transmitting a beamforming burst or a period or time interval between beamforming bursts.

In some aspects, the one or more configurations each include a respective indication of at least one of: a burst duration for transmitting one or more beamforming bursts; a period or time interval between beamforming bursts; a number of antenna panels to use for transmitting one or more beamforming bursts; a number of transmit beams per antenna panel of the one or more antenna panels of the first UE to use for transmitting one or more beamforming bursts; a total number of transmit beams, across all antenna panels of the one or more antenna panels of the first UE, to use for transmitting one or more beamforming bursts; a type of transmit beam of the one or more antenna panels to use for transmitting one or more beamforming bursts; or a number of beamforming bursts to transmit.

In some aspects, the method 1400 further includes receiving, from the network entity, control information indicating a set of time-frequency resources for transmitting the first beamforming burst and a set of time-frequency resources for monitoring for at least one response message. In some cases, the operations of this step refer to, or may be performed by, circuitry for receiving and/or code for receiving as described with reference to FIG. 16.

In some aspects, the indication of the set of time-frequency resources for transmitting the first beamforming burst comprises: a first subset of time-frequency resources of the set of time-frequency resources for transmitting a first beamforming transmission of the first beamforming burst using a first transmit beam of the different respective transmit beams of a first antenna panel of the one or more antenna panels of the first UE; a first time interval between adjacent beamforming transmissions, of the first beamforming burst, to be transmitted using the different respective transmit beams of the first antenna panel; a first number of the different respective transmit beams of the first antenna panel; and a first configuration information index indicating a first configuration of the one or more configurations in the configuration information.

In some aspects, transmitting at least the first beamforming burst comprises: transmitting, in the first subset of time-frequency resources, the first beamforming transmission via the first transmit beam of the first antenna panel based on the first configuration; and transmitting, based on the first configuration, at least a second beamforming transmission using a second transmit beam of the different respective transmit beams of the first antenna panel in a second subset of time-frequency resources of the set of time-frequency resources after the first time interval following transmission of the first beamforming transmission.

In some aspects, the indication of the set of time-frequency resources for transmitting the first beamforming burst comprises: a third subset of time-frequency resources of the set of time-frequency resources for transmitting a third beamforming transmission of the first beamforming burst using a third transmit beam of the different respective transmit beams of a second antenna panel of the one or more antenna panels of the first UE; a second time interval between adjacent beamforming transmissions, of the first beamforming burst, to be transmitted using the different respective transmit beams of the second antenna panel; a second number of the different respective transmit beams of the second antenna panel; and a second configuration information index indicating a second configuration of the one or more configurations in the configuration information.

In some aspects, transmitting at least the first beamforming burst comprises: transmitting, using the third subset of time-frequency resources, the third beamforming transmission via the third transmit beam of the second antenna panel based on the second configuration; and transmitting, based on the second configuration, at least a fourth beamforming transmission using a fourth transmit beam of the different respective transmit beams of the second antenna panel in a fourth subset of time-frequency resources of the set of time-frequency resources after the second time interval following transmission of the third beamforming transmission.

In some aspects, the set of time-frequency resources for transmitting the first beamforming burst comprises a set of semi-static time-frequency resources for transmitting at least first beamforming burst.

In some aspects, the control information indicating the set of time-frequency resources is received in at least one of the configuration information or an activation message for one or more configured grants.

In some aspects, the method 1400 further includes transmitting, to the network entity, a request indicating the first UE has one or more beamforming bursts to transmit. In some cases, the operations of this step refer to, or may be performed by, circuitry for transmitting and/or code for transmitting as described with reference to FIG. 16.

In some aspects, the control information is received based on the request indicating the first UE has one or more beamforming bursts to transmit; and the control information is received in a DCI message.

In some aspects, taking the one or more actions comprises transmitting, to the network entity, feedback information associated with the DCI message.

In some aspects, the DCI message further includes a feedback timing indicator indicating a time to transmit the feedback information associated with the DCI message; and transmitting the feedback information is based on the feedback timing indicator.

In some aspects, an ACK included in the feedback information is configured to indicate to the network entity that another beamforming burst is not necessary; and a NACK in the feedback information is configured to indicate to the network entity that transmission of at least a second beamforming burst is requested.

In some aspects, taking the one or more actions further comprise: including the NACK in the feedback information; and receiving, based on the NACK, a second DCI indicating resources for transmitting a second beamforming burst; and transmitting the second beamforming burst based on the indicated resources for transmitting the second beamforming burst.

In some aspects, including the NACK in the feedback information is based on one of: receiving, based on the monitoring, a response message from the second UE indicating to transmit the second beamforming burst based on the set of time-frequency resources for monitoring for at least one response message; or failing to receive, based on the monitoring, the at least one response message from the second UE, responding to at least one beamforming transmission of the one or more beamforming transmissions, within a threshold amount of time.

In some aspects, taking the one or more actions further comprises including the ACK in the feedback information based on receiving, based on the monitoring and on the set of time-frequency resources for monitoring for at least one response message, the at least one response message from the second UE indicating a beam pair link between one of the one or more transmit beams of the first UE and a receive beam of the second UE.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

FIG. 15 shows an example of a method 1500 of wireless communication by a network entity, such as a BS 102 of FIGS. 1 and 3, a disaggregated base station as discussed with respect to FIG. 2 and/or the network entity 902 described with respect to FIG. 9.

Method 1500 begins at step 1505 with receiving sidelink assistance information of a first UE. In some cases, the operations of this step refer to, or may be performed by, circuitry for receiving and/or code for receiving as described with reference to FIG. 17.

Method 1500 then proceeds to step 1510 with transmitting, to the UE based on the sidelink assistance information, configuration information indicating one or more configurations for an initial sidelink beamforming procedure involving transmission of at least a first beamforming burst including one or more beamforming transmissions. In some cases, the operations of this step refer to, or may be performed by, circuitry for transmitting and/or code for transmitting as described with reference to FIG. 17.

In some aspects, the one or more beamforming transmissions comprise at least one of one or more PSSCH transmissions or one or more S-RSBs.

In some aspects, the sidelink assistance information comprises at least one of: a number of antenna panels of one or more antenna panels of the first UE; a number of transmit beams per antenna panel of one or more antenna panels of the first UE; one or more transmit beam types supported by one or more antenna panels of the first UE; or one or more beamforming burst parameters, including at least one of a duration for transmitting a beamforming burst or a period or time interval between beamforming bursts.

In some aspects, the one or more configurations each include a respective indication of at least one of: a burst duration for transmitting one or more beamforming bursts; a period or time interval between beamforming bursts; a number of antenna panels to use for transmitting one or more beamforming bursts; a number of transmit beams per antenna panel of one or more antenna panels of the first UE to use for transmitting one or more beamforming bursts; a total number of transmit beams, across all antenna panels of one or more antenna panels of the first UE, to use for transmitting one or more beamforming bursts; a type of transmit beam of one or more antenna panels to use for transmitting one or more beamforming bursts; or a number of beamforming bursts to transmit.

In some aspects, the method 1500 further includes transmitting, to the first UE, control information indicating a set of time-frequency resources for transmitting the first beamforming burst. In some cases, the operations of this step refer to, or may be performed by, circuitry for transmitting and/or code for transmitting as described with reference to FIG. 17.

In some aspects, the indication of the set of time-frequency resources for transmitting the first beamforming burst comprises: a first subset of time-frequency resources of the set of time-frequency resources for transmitting a first beamforming transmission of the first beamforming burst using a first transmit beam of a first antenna panel of the UE; a first time interval between adjacent beamforming transmissions, of the first beamforming burst, to be transmitted using different respective transmit beams of the first antenna panel; a first number of the different respective transmit beams of the first antenna panel; and a first configuration information index indicating a first configuration of the one or more configurations in the configuration information.

In some aspects, the indication of the set of time-frequency resources for transmitting the first beamforming burst comprises: a second subset of time-frequency resources of the set of time-frequency resources for transmitting a second beamforming transmission of the first beamforming burst using a second transmit beam of a second antenna panel of the UE; a second time interval between adjacent beamforming transmissions, of the first beamforming burst, to be transmitted using different respective transmit beams of the second antenna panel; and a second number of the different respective transmit beams of the second antenna panel; and a second configuration information index indicating a second configuration of the one or more configurations in the configuration information.

In some aspects, the set of time-frequency resources for transmitting the first beamforming burst comprises a set of semi-static time-frequency resources for transmitting at least first beamforming burst.

In some aspects, the control information indicating the set of time-frequency resources is transmitted in at least one of the configuration information or an activation message for one or more configured grants.

In some aspects, the method 1500 further includes receiving, from the first UE, a request indicating the first UE has one or more beamforming bursts to transmit. In some cases, the operations of this step refer to, or may be performed by, circuitry for receiving and/or code for receiving as described with reference to FIG. 17.

In some aspects, the control information is transmitted based on the request indicating the first UE has one or more beamforming bursts to transmit; and the control information is transmitted in a DCI message.

In some aspects, the method 1500 further includes receiving, from the UE, feedback information associated with the DCI message. In some cases, the operations of this step refer to, or may be performed by, circuitry for receiving and/or code for receiving as described with reference to FIG. 17.

In some aspects, the DCI message further includes a feedback timing indicator indicating a time to transmit the feedback information associated with the DCI message; and receiving the feedback information is based on the feedback timing indicator.

In some aspects, the feedback information includes one of: an ACK configured to indicate to the network entity that another beamforming burst is not necessary; or a NACK configured to indicate to the network entity that transmission of at least a second beamforming burst is requested.

In some aspects, the NACK is included in the feedback information; and the method 1500 further includes transmitting, based on the NACK, a second DCI indicating resources for transmitting a second beamforming burst.

Figure 17:
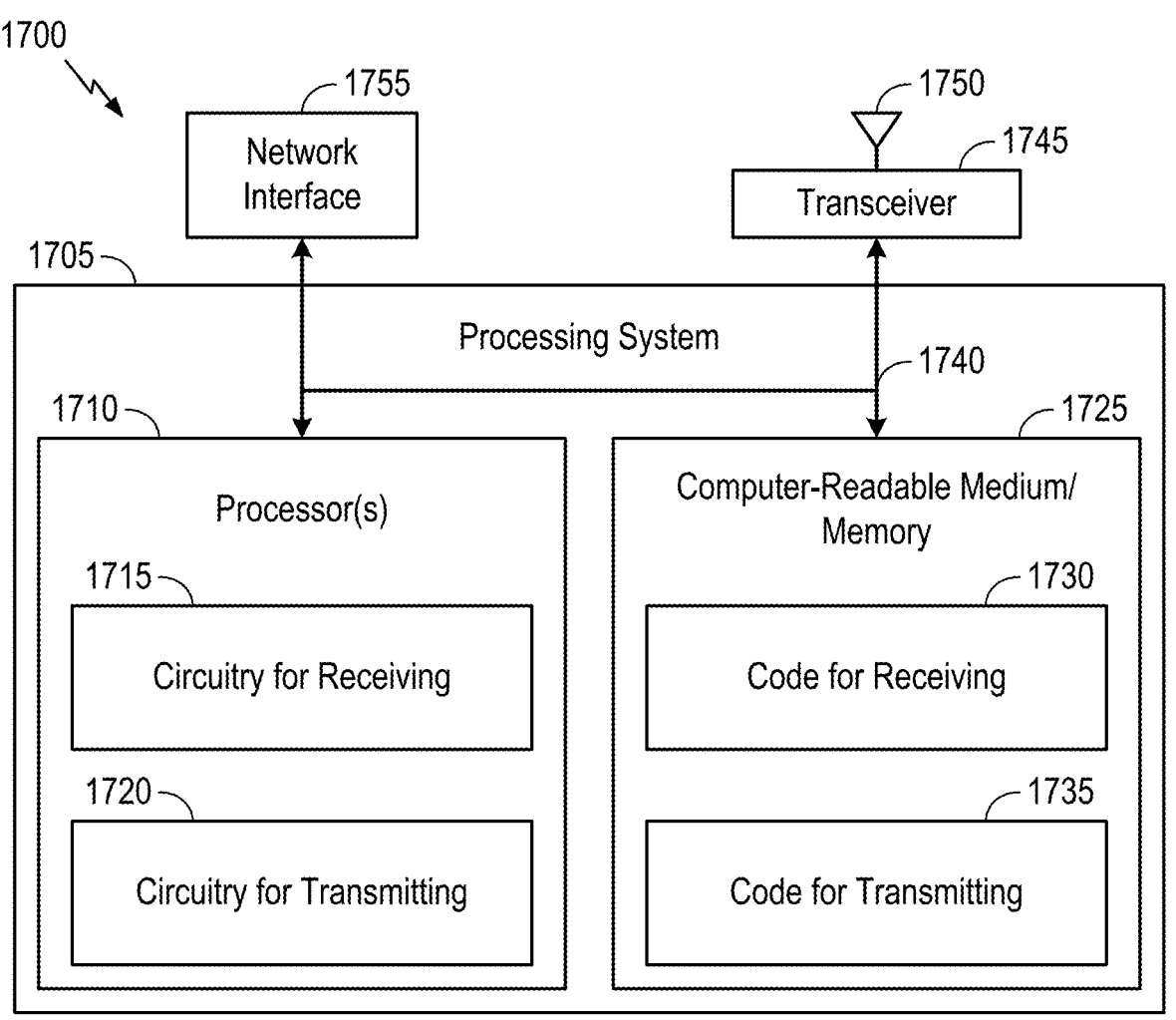
FIG. 17 depicts aspects of an example communications device.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

Example Communications Devices

FIG. 16 depicts aspects of an example communications device 1600. In some aspects, communications device 1600 is a user equipment, such as the UE 104 described above with respect to FIGS. 1 and 3, the first UE 702 described above with respect to FIG. 7, the second UE 704 described above with respect to FIG. 7, the first UE 904 described above with respect to FIG. 9, or the second UE 906 described above with respect to FIG. 9.

The communications device 1600 includes a processing system 1602 coupled to the transceiver 1646 (e.g., a transmitter and/or a receiver). The transceiver 1646 is configured to transmit and receive signals for the communications device 1600 via the antenna 1648, such as the various signals as described herein. The processing system 1602 may be configured to perform processing functions for the communications device 1600, including processing signals received and/or to be transmitted by the communications device 1600.

The processing system 1602 includes one or more processors 1604. In various aspects, the one or more processors 1604 may be representative of one or more of receive processor 358, transmit processor 364, TX MIMO processor 366, and/or controller/processor 380, as described with respect to FIG. 3. The one or more processors 1604 are coupled to a computer-readable medium/memory 1624 via a bus 1644. In certain aspects, the computer-readable medium/memory 1624 is configured to store instructions (e.g., computer-executable code) that when executed by the one or more processors 1604, cause the one or more processors 1604 to perform the method 1200 described with respect to FIG. 12, or any aspect related to it; the method 1300 described with respect to FIG. 13, or any aspect related to it; and the method 1400 described with respect to FIG. 14, or any aspect related to it. Note that reference to a processor performing a function of communications device 1600 may include one or more processors 1604 performing that function of communications device 1600.

In the depicted example, computer-readable medium/memory 1624 stores code (e.g., executable instructions), such as code for determining 1626, code for performing 1628, code for selecting 1630, code for generating 1632, code for sending 1634, code for receiving 1636, code for taking 1638, code for communicating 1640, and code for transmitting 1642. Processing of the code for determining 1626, code for performing 1628, code for selecting 1630, code for generating 1632, code for sending 1634, code for receiving 1636, code for taking 1638, code for communicating 1640, and code for transmitting 1642 may cause the communications device 1600 to perform the method 1200 described with respect to FIG. 12, or any aspect related to it; the method 1300 described with respect to FIG. 13, or any aspect related to it; and the method 1400 described with respect to FIG. 14, or any aspect related to it.

The one or more processors 1604 include circuitry configured to implement (e.g., execute) the code stored in the computer-readable medium/memory 1624, including circuitry such as circuitry for determining 1606, circuitry for performing 1608, circuitry for selecting 1610, circuitry for generating 1612, circuitry for sending 1614, circuitry for receiving 1616, circuitry for taking 1618, circuitry for communicating 1620, and circuitry for transmitting 1622. Processing with circuitry for determining 1606, circuitry for performing 1608, circuitry for selecting 1610, circuitry for generating 1612, circuitry for sending 1614, circuitry for receiving 1616, circuitry for taking 1618, circuitry for communicating 1620, and circuitry for transmitting 1622 may cause the communications device 1600 to perform the method 1200 described with respect to FIG. 12, or any aspect related to it; the method 1300 described with respect to FIG. 13, or any aspect related to it; and the method 1400 described with respect to FIG. 14, or any aspect related to it.

Various components of the communications device 1600 may provide means for performing the method 1200 described with respect to FIG. 12, or any aspect related to it; the method 1300 described with respect to FIG. 13, or any aspect related to it; and the method 1400 described with respect to FIG. 14, or any aspect related to it. For example, means for transmitting, sending or outputting for transmission may include transceivers 354 and/or antenna(s) 352 of the UE 104 illustrated in FIG. 3 and/or the transceiver 1646 and the antenna 1648 of the communications device 1600 in FIG. 16. Means for receiving or obtaining may include transceivers 354 and/or antenna(s) 352 of the UE 104 illustrated in FIG. 3 and/or the transceiver 1646 and the antenna 1648 of the communications device 1600 in FIG. 16.

FIG. 17 depicts aspects of an example communications device 1700. In some aspects, communications device 1700 is a network entity, such as BS 102 of FIGS. 1 and 3, or disaggregated base station as discussed with respect to FIG. 2, or the network entity 902 discussed with respect to FIG. 9.

The communications device 1700 includes a processing system 1705 coupled to the transceiver 1745 (e.g., a transmitter and/or a receiver) and/or a network interface 1755. The transceiver 1745 is configured to transmit and receive signals for the communications device 1700 via the antenna 1750, such as the various signals as described herein. The network interface 1755 is configured to obtain and send signals for the communications device 1700 via communication link(s), such as a backhaul link, midhaul link, and/or fronthaul link as described herein, such as with respect to FIG. 2. The processing system 1705 may be configured to perform processing functions for the communications device 1700, including processing signals received and/or to be transmitted by the communications device 1700.

The processing system 1705 includes one or more processors 1710. In various aspects, one or more processors 1710 may be representative of one or more of receive processor 338, transmit processor 320, TX MIMO processor 330, and/or controller/processor 340, as described with respect to FIG. 3. The one or more processors 1710 are coupled to a computer-readable medium/memory 1725 via a bus 1740. In certain aspects, the computer-readable medium/memory 1725 is configured to store instructions (e.g., computer-executable code) that when executed by the one or more processors 1710, cause the one or more processors 1710 to perform the method 1500 described with respect to FIG. 15, or any aspect related to it. Note that reference to a processor of communications device 1700 performing a function may include one or more processors 1710 of communications device 1700 performing that function.

In the depicted example, the computer-readable medium/memory 1725 stores code (e.g., executable instructions), such as code for receiving 1730 and code for transmitting 1735. Processing of the code for receiving 1730 and code for transmitting 1735 may cause the communications device 1700 to perform the method 1500 described with respect to FIG. 15, or any aspect related to it.

The one or more processors 1710 include circuitry configured to implement (e.g., execute) the code stored in the computer-readable medium/memory 1725, including circuitry such as circuitry for receiving 1715 and circuitry for transmitting 1720. Processing with circuitry for receiving 1715 and circuitry for transmitting 1720 may cause the communications device 1700 to perform the method 1500 described with respect to FIG. 15, or any aspect related to it.

Various components of the communications device 1700 may provide means for performing the method 1500 described with respect to FIG. 15, or any aspect related to it. Means for transmitting, sending or outputting for transmission may include transceivers 332 and/or antenna(s) 334 of the BS 102 illustrated in FIG. 3 and/or the transceiver 1745 and the antenna 1750 of the communications device 1700 in FIG. 17. Means for receiving or obtaining may include transceivers 332 and/or antenna(s) 334 of the BS 102 illustrated in FIG. 3 and/or the transceiver 1745 and the antenna 1750 of the communications device 1700 in FIG. 17.

Example Clauses

Implementation examples are described in the following numbered clauses:

Clause 1: A method for wireless communication by a first UE, comprising: determining one or more parameters for an initial sidelink beamforming procedure involving one or more transmit beams, each of the transmit beams associated with a respective antenna panel of the first UE; and performing, using the one or more parameters, the initial sidelink beamforming procedure, comprising: transmitting at least a first PSSCH burst, comprising transmitting each PSSCH transmission of one or more PSSCH transmissions using a different respective transmit beam of the one or more transmit beams, wherein each PSSCH transmission of the one or more PSSCH transmissions includes respective initial sidelink beamforming information; monitoring, based on the initial sidelink beamforming information, for at least one response message from a second UE responding to at least one of the one or more PSSCH transmissions; and taking one or more actions based on the monitoring.

Clause 2: The method of Clause 1, wherein the one or more parameters comprise at least one of a duration of the at least the first PSSCH burst, a periodicity associated with the at least the first PSSCH burst, or a time interval between PSSCH bursts of the at least the first PSSCH burst.

Clause 3: The method of Clause 2, wherein the duration of at least the first PSSCH burst is based on at least one of: a number of antenna panels a sidelink communication or sidelink beamforming; or a number of transmit beams for initiating a sidelink communication or sidelink beamforming.

Clause 4: The method of Clause 3, wherein at least one of: the number of antenna panels a sidelink communication or sidelink beamforming is pre-configured in memory of the first UE, received in configuration from a network entity, or determined by the first UE; or the number of transmit beams a sidelink communication or sidelink beamforming is pre-configured in memory of the first UE, received in configuration from a network entity, or determined by the first UE.

Clause 5: The method of Clause 2, wherein at least one of the periodicity or the time interval is determined based on at least one of: pre-configuration information stored in memory of the first UE; configuration information received from a network entity; a timing requirement associated with the initial sidelink beamforming procedure; or a timing requirement associated with an initial request for sidelink communication indicated within the one or more PSSCH transmissions.

Clause 6: The method of any one of Clauses 1-5, further comprising determining, in a MAC layer of the first UE, that data has been obtained from a higher layer indicating a LCID associated with an initial request for sidelink communication.

Clause 7: The method of Clause 6, wherein the one or more PSSCH transmissions further include the initial request for sidelink communication.

Clause 8: The method of Clause 7, wherein the initial request for sidelink communication comprises at least one of a sidelink application identifier, a service type identifier, or an identifier for one or more UEs.

Clause 9: The method of Clause 7, wherein the initial request for sidelink communication comprises one of a ProSe discovery request message, a direct communication request, or a beamforming MAC-CE.

Clause 10: The method of any one of Clauses 1-9, further comprising selecting, in a MAC layer of the first UE, a set of time-frequency resources for transmitting at least the first PSSCH burst.

Clause 11: The method of Clause 10, wherein the set of time-frequency resources are included in one of a continuous set of slots or a discontinuous set of slots.

Clause 12: The method of Clause 10, wherein selecting the set of time-frequency resources for transmitting the first PSSCH burst is based on a number of antenna panels for initiating a sidelink communication or sidelink beamforming and a number of transmit beams for initiating a sidelink communication or sidelink beamforming.

Clause 13: The method of any one of Clauses 1-12, wherein, for each PSSCH transmission of the one or more PSSCH transmissions, the respective initial sidelink beamforming information for that PSSCH transmission comprises: transmit beam information associated with a transmit beam for transmitting that PSSCH transmission; and at least one of: a set of preferred time-frequency resources for transmitting the at least one response message; or a set of non-preferred time-frequency resources to avoid using to transmit the at least one response message.

Clause 14: The method of Clause 13, wherein the transmit beam information associated with the transmit beam for transmitting that PSSCH transmission includes at least one of: a transmit beam ID of the transmit beam; an index within at least the first PSSCH burst that identifies the transmit beam; a TCI state associated with the transmit beam; or a spatial filter associated with the transmit beam.

Clause 15: The method of Clause 13, wherein the respective initial sidelink beamforming information is transmitted, in the one or more PSSCH transmissions, in at least one of: one or more a MAC-CEs; or second stage SCI.

Clause 16: The method of any one of Clauses 1-15, further comprising generating, in a MAC layer of the first UE, one or more MAC PDUs, wherein: each different MAC PDU of the one or more MAC PDUs corresponds to a respective PSSCH transmission of the one or more PSSCH transmissions; and each MAC PDU includes, at least, the respective initial sidelink beamforming information corresponding to the respective PSSCH transmission.

Clause 17: The method of Clause 16, further comprising sending the one or more MAC PDUs from the MAC layer of the first UE to a physical layer of the first UE for transmission in the one or more PSSCH transmissions.

Clause 18: The method of Clause 17, further comprising sending, from the MAC layer of the first UE to the physical layer of the first UE, information indicating that the one or more MAC PDUs correspond to at least the first PSSCH burst.

Clause 19: The method of Clause 18, wherein the information further indicates a beam type for transmitting the one or more MAC PDUs in the one or more PSSCH transmissions.

Clause 20: The method of Clause 19, wherein: the beam type comprises one of a wide transmit beam, a medium transmit beam, or a narrow transmit beam; and the beam type is based on at least one of a communication range for sidelink communication or a level of mobility associated with the first UE.

Clause 21: The method of Clause 17, further comprising sending, from the MAC layer of the first UE to the physical layer of the first UE, for each MAC PDU of the one or more MAC PDUs, information indicating: transmit beam information associated with the different respective transmit beam to be used to transmit a first PSSCH transmission, of the one or more PSSCH transmissions, in which that MAC PDU is to be included; and at least one of: a set of preferred time-frequency resources for transmitting the at least one response message corresponding the first PSSCH transmission including that MAC PDU; or a set of non-preferred time-frequency resources to avoid using to transmit the at least one response message corresponding the first PSSCH transmission including that MAC PDU.

Clause 22: The method of any one of Clauses 1-21, wherein: each different respective transmit beam of the one or more transmit beams is associated with a respective receive beam of one or more receive beams; and each respective receive beam is associated with a respective subset of time-frequency resources, of a set of time-frequency resources, to use to monitor for the at least one response message.

Clause 23: The method of Clause 22, wherein monitoring for the at least one response message comprises monitoring each respective subset of time-frequency resources using each respective receive beam for the at least one response message.

Clause 24: The method of any one of Clauses 1-23, further comprising receiving, from the second UE based on the monitoring, the at least one response message using a first receive beam of one or more receive beams.

Clause 25: The method of Clause 24, wherein the at least one response message comprises at least one of a discovery response, a direct communication response, an ACK message, or a NACK message.

Clause 26: The method of Clause 24, wherein: at least one response message indicates a first transmit beam of the one or more transmit beams; and taking the one or more actions comprises communicating with the second UE using the first transmit beam and the first receive beam.

Clause 27: The method of any one of Clauses 1-26, wherein taking the one or more actions comprises transmitting at least a second PSSCH burst based on the monitoring.

Clause 28: The method of Clause 27, wherein transmitting at least a second PSSCH burst is further based on one of: receiving the at least one response message including NACK or a request to transmit at least the second PSSCH burst; or failing to receive the at least one response message within a threshold amount of time.

Clause 29: A method for wireless communication by a second UE, comprising: receiving, from a first UE using a first receive beam of the second UE, a first PSSCH transmission of a first PSSCH burst, wherein: the first PSSCH transmission is associated with a respective transmit beam of one or more transmit beams of the first UE; and the first PSSCH transmission of the one or more PSSCH transmissions includes respective initial sidelink beamforming information; and taking one or more actions based on the first PSSCH transmission.

Clause 30: The method of Clause 29, wherein the respective initial sidelink beamforming information included in the first PSSCH transmission comprises: transmit beam information associated with the respective transmit beam of the first UE used for transmitting the first PSSCH transmission; and at least one of: a set of preferred time-frequency resources for transmitting at least one response message; or a set of non-preferred time-frequency resources to avoid using to transmit at least one response message.

Clause 31: The method of Clause 30, wherein the transmit beam information associated with the respective transmit beam of the first UE used for transmitting the first PSSCH transmission includes at least one of: a transmit beam ID of the respective transmit beam; an index within the first PSSCH burst that identifies the respective transmit beam; a TCI state associated with the respective transmit beam; or a spatial filter associated with the respective transmit beam.

Clause 32: The method of Clause 30, wherein the respective initial sidelink beamforming information is received, in the first PSSCH transmission, in at least one of: one or more a MAC-CEs; or second stage SCI.

Clause 33: The method of Clause 30, wherein: taking the one or more actions comprises transmitting, using a first transmit beam of the second UE, at least one response message to the first UE based on the respective initial sidelink beamforming information included in the first PSSCH transmission; and the first transmit beam of the second UE corresponds to the first receive beam of the second UE.

Clause 34: The method of Clause 33, wherein transmitting the at least one response message comprises transmitting the response message in a sub-set of time-frequency resources according to one of the set of preferred time-frequency resources or the set of non-preferred time-frequency resources.

Clause 35: The method of Clause 33, wherein the at least one response message indicates at least one of: the respective transmit beam of one or more transmit beams of the first UE; or the first receive beam of the second UE.

Clause 36: The method of Clause 33, further comprising communicating with the first UE using the first transmit beam of the second UE and the first receive beam of the second UE.

Clause 37: The method of any one of Clauses 29-36, wherein taking the one or more actions based on the first PSSCH transmission comprises determining whether to receive at least a second PSSCH transmission of a second PSSCH burst using a second receive beam of the UE.

Clause 38: The method of Clause 37, wherein the first PSSCH transmission includes an initial request for sidelink communication.

Clause 39: The method of Clause 38, wherein: the initial request for sidelink communication includes at least one of a sidelink application identifier, a service type identifier, or an identifier for one or more UEs; and determining whether to receive at least the second PSSCH transmission is based on the at least one of the sidelink application identifier, the service type identifier, or the identifier for one or more UEs.

Clause 40: The method of Clause 38, wherein the initial request for sidelink communication comprises one of a ProSe discovery request message, a direct communication request, or a beamforming MAC-CE.

Clause 41: The method of Clause 37, further comprising performing beam measurements associated with the first receive beam based on the first PSSCH transmission, wherein determining whether to receive at least the second PSSCH transmission is based on the beam measurements.

Clause 42: The method of Clause 41, wherein the beam measurements comprise SL RSRP measurements.

Clause 43: The method of Clause 41, wherein determining whether to receive at least the second PSSCH transmission comprises determining to receive at least the second PSSCH transmission when the beam measurements are less than a threshold.

Clause 44: The method of Clause 37, wherein: when it is determined to receive at least the second PSSCH transmission, taking the one or more actions further comprises receiving, from the first UE using a second receive beam of the second UE, the second PSSCH transmission of a second PSSCH burst; and the second PSSCH transmission includes respective initial sidelink beamforming information.

Clause 45: The method of Clause 44, wherein receiving the second PSSCH transmission is based on transmit beam information associated with the respective transmit beam of the first UE and resource reservation information indicated in sidelink control information received in the first PSSCH transmission.

Clause 46: The method of Clause 44, wherein, in order to receive the second PSSCH transmission, the method further comprises one of: transmitting at least one response message including NACK or a request to transmit at least the second PSSCH burst; or not transmitting at least one response message within a threshold amount of time.

Clause 47: The method of Clause 44, further comprising: performing beam measurements associated with the first receive beam based on the first PSSCH transmission; and performing beam measurements associated with the second receive beam based on the second PSSCH transmission.

Clause 48: The method of Clause 47, further comprising selecting, based on beam measurements associated with the first receive beam and the beam measurements associated with the second receive beam, one of the first receive beam or the second receive beam for sidelink communication with the first UE.

Clause 49: The method of Clause 48, wherein taking the one or more actions comprises transmitting at least one response message to the first UE using a first transmit beam of the second UE corresponding with the selected one of the first receive beam or the second receive beam.

Clause 50: The method of Clause 49, wherein the at least one response message indicates at least one of: the respective transmit beam of one or more transmit beams of the first UE; or the selected one of the first receive beam of the second UE or the second receive beam of the second UE.

Clause 51: The method of Clause 49, wherein transmitting the at least one response message is based on the respective initial sidelink beamforming information received using the selected one of the first receive beam of the second UE or the second receive beam of the second UE.

Clause 52: A method for wireless communication by a first UE, comprising: receiving, from a network entity, configuration information indicating one or more configurations for an initial sidelink beamforming procedure involving one or more transmit beams of the first UE, each of the transmit beams associated with a respective antenna panel of the first UE; and performing, based on the configuration information, the initial sidelink beamforming procedure, comprising: transmitting at least a first beamforming burst, comprising transmitting each beamforming transmission of one or more beamforming transmissions using a different respective transmit beam of the one or more transmit beams of one or more antenna panels of the first UE; monitoring for at least one response message from a second UE responding to at least one of the one or more beamforming transmissions; and taking one or more actions based on the monitoring.

Clause 53: The method of Clause 52, wherein the one or more beamforming transmissions comprise at least one of one or more PSSCH transmissions or one or more S-RSBs.

Clause 54: The method of any one of Clauses 52-53, further comprising transmitting, to the network entity, sidelink assistance information, wherein the configuration information for the initial sidelink beamforming procedure is based on the sidelink assistance information.

Clause 55: The method of Clause 54, wherein the sidelink assistance information comprises at least one of: a number of antenna panels of the one or more antenna panels of the first UE; a number of transmit beams per antenna panel of the one or more antenna panels of the first UE; one or more transmit beam types supported by the one or more antenna panels of the first UE; or one or more beamforming burst parameters, including at least one of a duration for transmitting a beamforming burst or a period or time interval between beamforming bursts.

Clause 56: The method of any one of Clauses 52-55, wherein the one or more configurations each include a respective indication of at least one of: a burst duration for transmitting one or more beamforming bursts; a period or time interval between beamforming bursts; a number of antenna panels to use for transmitting one or more beamforming bursts; a number of transmit beams per antenna panel of the one or more antenna panels of the first UE to use for transmitting one or more beamforming bursts; a total number of transmit beams, across all antenna panels of the one or more antenna panels of the first UE, to use for transmitting one or more beamforming bursts; a type of transmit beam of the one or more antenna panels to use for transmitting one or more beamforming bursts; or a number of beamforming bursts to transmit.

Clause 57: The method of any one of Clauses 52-56, further comprising receiving, from the network entity, control information indicating a set of time-frequency resources for transmitting the first beamforming burst and a set of time-frequency resources for monitoring for at least one response message based on the first beamforming burst.

Clause 58: The method of Clause 57, wherein the indication of the set of time-frequency resources for transmitting the first beamforming burst comprises: a first subset of time-frequency resources of the set of time-frequency resources for transmitting a first beamforming transmission of the first beamforming burst using a first transmit beam of the different respective transmit beams of a first antenna panel of the one or more antenna panels of the first UE; a first time interval between adjacent beamforming transmissions, of the first beamforming burst, to be transmitted using the different respective transmit beams of the first antenna panel; a first number of the different respective transmit beams of the first antenna panel; and a first configuration information index indicating a first configuration of the one or more configurations in the configuration information.

Clause 59: The method of Clause 58, wherein transmitting at least the first beamforming burst comprises: transmitting, in the first subset of time-frequency resources, the first beamforming transmission via the first transmit beam of the first antenna panel based on the first configuration; and transmitting, based on the first configuration, at least a second beamforming transmission using a second transmit beam of the different respective transmit beams of the first antenna panel in a second subset of time-frequency resources of the set of time-frequency resources after the first time interval following transmission of the first beamforming transmission.

Clause 60: The method of Clause 59, wherein the indication of the set of time-frequency resources for transmitting the first beamforming burst comprises: a third subset of time-frequency resources of the set of time-frequency resources for transmitting a third beamforming transmission of the first beamforming burst using a third transmit beam of the different respective transmit beams of a second antenna panel of the one or more antenna panels of the first UE; a second time interval between adjacent beamforming transmissions, of the first beamforming burst, to be transmitted using the different respective transmit beams of the second antenna panel; a second number of the different respective transmit beams of the second antenna panel; and a second configuration information index indicating a second configuration of the one or more configurations in the configuration information.

Clause 61: The method of Clause 60, wherein transmitting at least the first beamforming burst comprises: transmitting, using the third subset of time-frequency resources, the third beamforming transmission via the third transmit beam of the second antenna panel based on the second configuration; and transmitting, based on the second configuration, at least a fourth beamforming transmission using a fourth transmit beam of the different respective transmit beams of the second antenna panel in a fourth subset of time-frequency resources of the set of time-frequency resources after the second time interval following transmission of the third beamforming transmission.

Clause 62: The method of Clause 57, wherein the set of time-frequency resources for transmitting the first beamforming burst comprises a set of semi-static time-frequency resources for transmitting at least first beamforming burst.

Clause 63: The method of Clause 62, wherein the control information indicating the set of time-frequency resources is received in at least one of the configuration information or an activation message for one or more configured grants.

Clause 64: The method of Clause 57, further comprising transmitting, to the network entity, a request indicating the first UE has one or more beamforming bursts to transmit.

Clause 65: The method of Clause 64, wherein: the control information is received based on the request indicating the first UE has one or more beamforming bursts to transmit; and the control information is received in a DCI message.

Clause 66: The method of Clause 65, wherein taking the one or more actions comprises transmitting, to the network entity, feedback information associated with the DCI message.

Clause 67: The method of Clause 66, wherein: the DCI message further includes a feedback timing indicator indicating a time to transmit the feedback information associated with the DCI message; and transmitting the feedback information is based on the feedback timing indicator.

Clause 68: The method of Clause 66, wherein the feedback information includes one of: an ACK configured to indicate to the network entity that another beamforming burst is not necessary; or a NACK configured to indicate to the network entity that transmission of at least a second beamforming burst is requested.

Clause 69: The method of Clause 68, wherein taking the one or more actions further comprise: including the NACK in the feedback information; and receiving, based on the NACK, a second DCI indicating resources for transmitting a second beamforming burst; and transmitting the second beamforming burst based on the indicated resources for transmitting the second beamforming burst.

Clause 70: The method of Clause 69, wherein including the NACK in the feedback information is based on one of: receiving, based on the monitoring, the at least one response message from the second UE indicating to transmit the second beamforming burst based on the set of time-frequency resources for monitoring for at least one response message; or failing to receive, based on the monitoring, the at least one response message from the second UE, responding to at least one beamforming transmission of the one or more beamforming transmissions, within a threshold amount of time.

Clause 71: The method of Clause 68, wherein taking the one or more actions further comprises including the ACK in the feedback information based on receiving, based on the monitoring and on the set of time-frequency resources for monitoring for at least one response message, the at least one response message from the second UE indicating a beam pair link between one of the one or more transmit beams of the first UE and a receive beam of the second UE.

Clause 72: A method for wireless communication by a network entity, comprising: receiving sidelink assistance information of a first UE; and transmitting, to the UE based on the sidelink assistance information, configuration information indicating one or more configurations for an initial sidelink beamforming procedure involving transmission of at least a first beamforming burst including one or more beamforming transmissions.

Clause 73: The method of Clause 72, wherein the one or more beamforming transmissions comprise at least one of one or more PSSCH transmissions or one or more S-RSBs.

Clause 74: The method of any one of Clauses 72-73, wherein the sidelink assistance information comprises at least one of: a number of antenna panels of one or more antenna panels of the first UE; a number of transmit beams per antenna panel of one or more antenna panels of the first UE; one or more transmit beam types supported by one or more antenna panels of the first UE; or one or more beamforming burst parameters, including at least one of a duration for transmitting a beamforming burst or a period or time interval between beamforming bursts.

Clause 75: The method of any one of Clauses 72-74, wherein the one or more configurations each include a respective indication of at least one of: a burst duration for transmitting one or more beamforming bursts; a period or time interval between beamforming bursts; a number of antenna panels to use for transmitting one or more beamforming bursts; a number of transmit beams per antenna panel of one or more antenna panels of the first UE to use for transmitting one or more beamforming bursts; a total number of transmit beams, across all antenna panels of one or more antenna panels of the first UE, to use for transmitting one or more beamforming bursts; a type of transmit beam of one or more antenna panels to use for transmitting one or more beamforming bursts; or a number of beamforming bursts to transmit.

Clause 76: The method of any one of Clauses 72-75, further comprising transmitting, to the first UE, control information indicating: a set of time-frequency resources for transmitting the first beamforming burst and a set of time-frequency resources for monitoring for at least one response message based on the first beamforming burst.

Clause 77: The method of Clause 76, wherein the indication of the set of time-frequency resources for transmitting the first beamforming burst comprises: a first subset of time-frequency resources of the set of time-frequency resources for transmitting a first beamforming transmission of the first beamforming burst using a first transmit beam of a first antenna panel of the UE; a first time interval between adjacent beamforming transmissions, of the first beamforming burst, to be transmitted using different respective transmit beams of the first antenna panel; a first number of the different respective transmit beams of the first antenna panel; and a first configuration information index indicating a first configuration of the one or more configurations in the configuration information.

Clause 78: The method of Clause 77, wherein the indication of the set of time-frequency resources for transmitting the first beamforming burst comprises: a second subset of time-frequency resources of the set of time-frequency resources for transmitting a second beamforming transmission of the first beamforming burst using a second transmit beam of a second antenna panel of the UE; a second time interval between adjacent beamforming transmissions, of the first beamforming burst, to be transmitted using different respective transmit beams of the second antenna panel; and a second number of the different respective transmit beams of the second antenna panel; and a second configuration information index indicating a second configuration of the one or more configurations in the configuration information.

Clause 79: The method of Clause 76, wherein the set of time-frequency resources for transmitting the first beamforming burst comprises a set of semi-static time-frequency resources for transmitting at least first beamforming burst.

Clause 80: The method of Clause 79, wherein the control information indicating the set of time-frequency resources is transmitted in at least one of the configuration information or an activation message for one or more configured grants.

Clause 81: The method of Clause 76, further comprising receiving, from the first UE, a request indicating the first UE has one or more beamforming bursts to transmit.

Clause 82: The method of Clause 81, wherein: the control information is transmitted based on the request indicating the first UE has one or more beamforming bursts to transmit; and the control information is transmitted in a DCI message.

Clause 83: The method of Clause 82, further comprising receiving, from the UE, feedback information associated with the DCI message.

Clause 84: The method of Clause 83, wherein: the DCI message further includes a feedback timing indicator indicating a time to transmit the feedback information associated with the DCI message; and receiving the feedback information is based on the feedback timing indicator.

Clause 85: The method of Clause 83, wherein the feedback information includes one of: an ACK configured to indicate to the network entity that another beamforming burst is not necessary; or a NACK configured to indicate to the network entity that transmission of at least a second beamforming burst is requested.

Clause 86: The method of Clause 85, wherein: the NACK is included in the feedback information; and the method further comprises transmitting, based on the NACK, a second DCI indicating resources for transmitting a second beamforming burst.

Clause 87: An apparatus, comprising: one or more processors, individually or collectively, configured to execute instructions stored on one or more processors and to cause the apparatus to perform a method in accordance with any one of Clauses 1-86.

Clause 88: An apparatus, comprising means for performing a method in accordance with any one of Clauses 1-86.

Clause 89: A non-transitory computer-readable medium comprising executable instructions that, when executed by one or more processors of an apparatus, cause the apparatus to perform a method in accordance with any one of Clauses 1-86.

Clause 90: A computer program product embodied on a computer-readable storage medium comprising code for performing a method in accordance with any one of Clauses 1-86.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a first user equipment (UE), comprising:
   one or more processors configured to execute instructions stored on one or more memories and to cause the first UE to:
      determine one or more parameters for an initial sidelink beamforming procedure involving one or more transmit beams; and
      perform, using the one or more parameters, the initial sidelink beamforming procedure, wherein in order to perform the initial sidelink beamforming procedure, the one or more processors are configured to cause the first UE to:
         transmit at least a first physical sidelink shared channel (PSSCH) burst, wherein:
            in order to transmit at least the first PSSCH burst, the one or more processors are configured to cause the UE to transmit each PSSCH transmission of one or more PSSCH transmissions using a different respective transmit beam of the one or more transmit beams, and
            each PSSCH transmission of the one or more PSSCH transmissions includes respective initial sidelink beamforming information;
         monitor, based on the initial sidelink beamforming information, for at least one response message from a second UE responding to at least one of the one or more PSSCH transmissions; and
         take one or more actions based on the monitoring.

2. The apparatus of claim 1, wherein:
   the one or more parameters comprise at least one of a duration of the at least the first PSSCH burst, a periodicity associated with the at least the first PSSCH burst, or a time interval between PSSCH bursts of the at least the first PSSCH burst; and
   at least one of the periodicity or the time interval is determined based on at least one of:
      pre-configuration information stored in memory of the first UE;
      configuration information received from a network entity;
      a timing requirement associated with the initial sidelink beamforming procedure; or
      a timing requirement associated with an initial request for sidelink communication indicated within the one or more PSSCH transmissions.

3. The apparatus of claim 1, wherein the one or more processors are further configured to cause the first UE to determine, in a media access control (MAC) layer of the first UE, that data has been obtained from a higher layer indicating a logical channel identifier (LCID) associated with an initial request for sidelink communication.

4. The apparatus of claim 3, wherein:
   the one or more PSSCH transmissions further include the initial request for sidelink communication; and
   at least one of:

the initial request for sidelink communication comprises at least one of a sidelink application identifier, a service type identifier, or an identifier for one or more UEs; or
      the initial request for sidelink communication comprises one of a ProSe discovery request message, a direct communication request, or a beamforming media access control-control element (MAC-CE).

5. The apparatus of claim 1, wherein the one or more processors are further configured to cause the first UE to select, in a media access control (MAC) layer of the first UE, a set of time-frequency resources for transmitting at least the first PSSCH burst.

6. The apparatus of claim 1, wherein, for each PSSCH transmission of the one or more PSSCH transmissions, the respective initial sidelink beamforming information for that PSSCH transmission comprises:
   transmit beam information associated with a transmit beam for transmitting that PSSCH transmission; and
   at least one of:
      a set of preferred time-frequency resources for transmitting the at least one response message; or
      a set of non-preferred time-frequency resources to avoid using to transmit the at least one response message.

7. The apparatus of claim 6, wherein the transmit beam information associated with the transmit beam for transmitting that PSSCH transmission includes at least one of:
   a transmit beam identifier (ID) of the transmit beam;
   an index within at least the first PSSCH burst that identifies the transmit beam;
   a transmission configuration indicator (TCI) state associated with the transmit beam; or
   a spatial filter associated with the transmit beam.

8. The apparatus of claim 6, wherein the respective initial sidelink beamforming information is transmitted, in the one or more PSSCH transmissions, in at least one of:
   one or more a medium access control-control elements (MAC-CEs); or
   second stage sidelink control information (SCI).

9. The apparatus of claim 1, wherein:
   each different respective transmit beam of the one or more transmit beams is associated with a respective receive beam of one or more receive beams; and
   each respective receive beam is associated with a respective subset of time-frequency resources, of a set of time-frequency resources, to use to monitor for the at least one response message.

10. The apparatus of claim 9, wherein, in order to monitor for the at least one response message, wherein the one or more processors are configured to cause the first UE to monitor each respective subset of time-frequency resources using each respective receive beam for the at least one response message.

11. The apparatus of claim 1, wherein the one or more processors are further configured to cause the first UE to receive, from the second UE based on the monitoring, the at least one response message using a first receive beam of one or more receive beams.

12. The apparatus of claim 11, wherein the at least one response message comprises at least one of a discovery response, a direct communication response, an acknowledgement (ACK) message, or a negative ACK (NACK) message.

13. The apparatus of claim 11, wherein:
   at least one response message indicates a first transmit beam of the one or more transmit beams; and in order to take the one or more actions, wherein the one or more processors are configured to cause the first UE to communicate communicating with the second UE using the first transmit beam and the first receive beam.

14. The apparatus of claim 1, wherein:

in order to take the one or more actions, wherein the one or more processors are configured to cause the first UE to transmit at least a second PSSCH burst based on the monitoring; and the one or more processors are configured to cause the first UE to transmit at least the second PSSCH burst further based on one of:

reception of the at least one response message including negative acknowledgement information (NACK) or a request to transmit at least the second PSSCH burst; or failure to receive the at least one response message within a threshold amount of time.

15. An apparatus for wireless communication by a second user equipment (UE), comprising:

one or more processors configured to execute instructions stored on one or more memories and to cause the second UE to:

receive, from a first UE using a first receive beam of the second UE, a first physical sidelink shared channel (PSSCH) transmission of a first PSSCH burst, wherein:

the first PSSCH transmission is associated with a respective transmit beam of one or more transmit beams of the first UE; and the first PSSCH transmission of the one or more PSSCH transmissions includes respective initial sidelink beamforming information, comprising at least one of:

a set of preferred time-frequency resources for transmitting at least one response message; or a set of non-preferred time-frequency resources to avoid using to transmit at least one response message; and take one or more actions based on the first PSSCH transmission.

16. The apparatus of claim 15, wherein the respective initial sidelink beamforming information included in the first PSSCH transmission further comprises transmit beam information associated with the respective transmit beam of the first UE used for transmitting the first PSSCH transmission.

17. The apparatus of claim 16, wherein the transmit beam information associated with the respective transmit beam of the first UE used for transmitting the first PSSCH transmission includes at least one of:

a transmit beam identifier (ID) of the respective transmit beam;

an index within the first PSSCH burst that identifies the respective transmit beam;

a transmission configuration indicator (TCI) state associated with the respective transmit beam; or a spatial filter associated with the respective transmit beam.

18. The apparatus of claim 16, wherein the respective initial sidelink beamforming information is received, in the first PSSCH transmission, in at least one of:

one or more a medium access control-control elements (MAC-CEs); or second stage sidelink control information (SCI).

19. The apparatus of claim 16, wherein:

in order to take the one or more actions, the one or more processors are configured to cause the second UE to transmit, using a first transmit beam of the second UE, at least one response message to the first UE based on the respective initial sidelink beamforming information included in the first PSSCH transmission; and the first transmit beam of the second UE corresponds to the first receive beam of the second UE.

20. The apparatus of claim 19, wherein, in order to transmit the at least one response message, the one or more processors are configured to cause the second UE to transmit the response message in a sub-set of time-frequency resources according to one of the set of preferred time-frequency resources or the set of non-preferred time-frequency resources.

21. The apparatus of claim 19, wherein the at least one response message indicates at least one of:

the respective transmit beam of one or more transmit beams of the first UE; or the first receive beam of the second UE.

22. The apparatus of claim 19, the one or more processors are further configured to cause the second UE to communicate with the first UE using the first transmit beam of the second UE and the first receive beam of the second UE.

23. The apparatus of claim 15, wherein, in order to take the one or more actions based on the first PSSCH transmission, the one or more processors are configured to cause the second UE to determine whether to receive at least a second PSSCH transmission of a second PSSCH burst using a second receive beam of the UE.

24. The apparatus of claim 23, wherein:

the first PSSCH transmission includes an initial request for sidelink communication; and the initial request for sidelink communication comprises one of a ProSe discovery request message, a direct communication request, or a beamforming media access control-control element (MAC-CE).

25. The apparatus of claim 24, wherein:

the initial request for sidelink communication includes at least one of a sidelink application identifier, a service type identifier, or an identifier for one or more UEs; and the one or more processors are configured to cause the second UE to determine whether to receive at least the second PSSCH transmission based on the at least one of the sidelink application identifier, the service type identifier, or the identifier for one or more UEs.

26. The apparatus of claim 23, the one or more processors are further configured to cause the second UE to:

perform beam measurements associated with the first receive beam based on the first PSSCH transmission; and perform beam measurements associated with the second receive beam based on the second PSSCH transmission, wherein the beam measurements associated with the first receive beam and the beam measurements associated with the second receive beam comprise beam sidelink reference signal received power (SL RSRP) measurements.

27. The apparatus of claim 26, the one or more processors are configured to cause the second UE to select, based on beam measurements associated with the first receive beam and the beam measurements associated with the second receive beam, one of the first receive beam or the second receive beam for sidelink communication with the first UE.

28. The apparatus of claim 27, wherein:

in order to take the one or more actions, the one or more processors are configured to cause the second UE to transmit at least one response message to the first UE using a first transmit beam of the second UE corre-

| sponding with the selected one of the first receive beam or the second receive beam;

the at least one response message indicates at least one of:

the respective transmit beam of one or more transmit beams of the first UE; or the selected one of the first receive beam of the second UE or the second receive beam of the second UE; and the one or more processors are configured to cause the second UE to transmit the at least one response message based on the respective initial sidelink beamforming information received using the selected one of the first receive beam of the second UE or the second receive beam of the second UE.

29. A method for wireless communication by a first user equipment (UE), comprising:

determining one or more parameters for an initial sidelink beamforming procedure involving one or more transmit beams; and performing, using the one or more parameters, the initial sidelink beamforming procedure, comprising:

transmitting at least a first physical sidelink shared channel (PSSCH) burst, comprising transmitting each PSSCH transmission of one or more PSSCH transmissions using a different respective transmit beam of the one or more transmit beams, wherein each PSSCH transmission of the one or more PSSCH transmissions includes respective initial sidelink beamforming information;

monitoring, based on the initial sidelink beamforming information, for at least one response message from a second UE responding to at least one of the one or more PSSCH transmissions; and taking one or more actions based on the monitoring.

30. A method for wireless communication by a second user equipment (UE), comprising:

receiving, from a first UE using a first receive beam of the second UE, a first physical sidelink shared channel (PSSCH) transmission of a first PSSCH burst, wherein:

the first PSSCH transmission is associated with a respective transmit beam of one or more transmit beams of the first UE; and the first PSSCH transmission of the one or more PSSCH transmissions includes respective initial sidelink beamforming information, comprising at least one of:

a set of preferred time-frequency resources for transmitting at least one response message; or a set of non-preferred time-frequency resources to avoid using to transmit at least one response message; and taking one or more actions based on the first PSSCH transmission.

* * * * *